United States Patent
Suzuki et al.

(10) Patent No.: US 8,501,878 B2
(45) Date of Patent: Aug. 6, 2013

(54) METHOD FOR PRODUCING POLYCARBONATE MATERIAL HAVING EXCELLENT SOLUBILITY AND AFFINITY, AND CONTACT LENS MATERIAL COMPRISING THE SAME

(75) Inventors: Yasuhiko Suzuki, Nagoya (JP);
Kazuhiko Nakada, Nagoya (JP);
Tsuyoshi Watanabe, Nagoya (JP);
Takahiro Adachi, Kamisu (JP);
Mamoru Hagiwara, Annaka (JP);
Masahiko Minemura, Annaka (JP)

(73) Assignees: Menicon Co., Ltd., Nagoya-shi (JP);
Mitsubishi Gas Chemical Company, Inc., Tokyo (JP); Shin-Etsu Chemical Co., Ltd., Tokyo (JP)

( * ) Notice: Subject to any disclaimer, the term of this patent is extended or adjusted under 35 U.S.C. 154(b) by 20 days.

(21) Appl. No.: 13/383,993

(22) PCT Filed: Jul. 15, 2009

(86) PCT No.: PCT/JP2009/062797
§ 371 (c)(1),
(2), (4) Date: Jan. 13, 2012

(87) PCT Pub. No.: WO2011/007427
PCT Pub. Date: Jan. 20, 2011

(65) Prior Publication Data
US 2012/0116028 A1    May 10, 2012

(51) Int. Cl.
*G02B 1/04* (2006.01)
*C08L 83/06* (2006.01)
*C08L 67/00* (2006.01)

(52) U.S. Cl.
USPC ............................ 525/474; 525/416; 523/107

(58) Field of Classification Search
USPC .................................. 525/474, 418; 523/107
See application file for complete search history.

(56) References Cited

U.S. PATENT DOCUMENTS
2009/0012205 A1 * 1/2009 Nakada et al. ................ 523/107

FOREIGN PATENT DOCUMENTS

| EP | 1 840 167 A1 | 3/2007 |
|---|---|---|
| JP | 60-203632 | 10/1985 |
| JP | 9-50144 | 2/1997 |
| JP | 2000-206721 | 7/2000 |
| JP | 2005-60560 A1 | 3/2005 |
| JP | 2005-206699 A1 | 8/2005 |
| JP | 2006-199819 A1 | 8/2006 |
| JP | 2008-101191 | 5/2008 |

OTHER PUBLICATIONS

Supplementary European Search Report dated Dec. 10, 2012, in the corresponding European patent application No. 09847325.9.
Notification of Transmittal of Translation of the International Preliminary Report on Patentability regarding International Application No. PCT/JP2009/062797, mailed Feb. 16, 2012, including International Preliminary Report on Patentability and Written Opinion of the International Searching Authority.
International Search Report for International Application No. PCT/JP2009/062797 dated Sep. 8, 2009.

* cited by examiner

*Primary Examiner* — William Cheung
(74) *Attorney, Agent, or Firm* — Kratz, Quintos & Hanson, LLP

(57) ABSTRACT

According to the present invention, a contact lens material being excellent in oxygen permeability and transparency, being capable of undergoing injection molding, having no water content and having flexibility, as well as a contact lens gel material having excellent oxygen permeability and transparency can be provided. The present invention relates to a contact lens material comprising a polycarbonate resin derived from at least two compounds among compounds represented by a general formula (A), a general formula (B) and a general formula (C), a highly polar molecular weight control modifier (chain terminator) and a compound forming a carbonic acid ester, wherein the compound of the general formula (A) is essentially comprised, and to a production method thereof.

29 Claims, No Drawings

METHOD FOR PRODUCING POLYCARBONATE MATERIAL HAVING EXCELLENT SOLUBILITY AND AFFINITY, AND CONTACT LENS MATERIAL COMPRISING THE SAME

This application is International Stage Application of PCT/JP2009/062797 filed Jul. 15, 2009.

TECHNICAL FIELD

The present invention relates to a contact lens material, particularly relates to a method for producing polycarbonate material having excellent solubility and affinity, and to a contact lens material comprising the same.

BACKGROUND ART

A contact lens is to be worn in a human eye in order to correct vision, and the development of a contact lens material having low double refraction, excellent oxygen permeability and moldability has been advanced. As a raw material for a contact lens, a polycarbonate material is used. Generally, for preparing a polycarbonate resin, a molecular weight control modifier (chain terminator) such as alkyl-substituted phenol is added thereto in order to control the molecular weight. Examples of a molecular weight control modifier (chain terminator) include highly polar substituted phenols having, for example, a hydroxyalkyl group or a carboxyalkyl group, and by using those, properties of a polycarbonate resin can be changed.

In the case of assuming application to a contact lens like the application in the present invention, it goes without saying that surface wettability is important, and for example, in the case of preparing a transparent gel which comprises the polycarbonate resin and the hydrophilic polymer obtained by polymerizing a hydrophilic monomer and has an interpenetrating network structure of the resin and the hydrophilic polymer, it was confirmed that solubility in the hydrophilic monomer is significantly improved. It is clear that by improving solubility, excellent optical performance and mechanical properties as the contact lens can be exhibited. On the other hand, in the case of use as a contact lens, by blending a polycarbonate resin alone or in combination with other resin, surface characteristics such as surface wettability and adhesion can be improved.

For example, in Patent Document 1, a contact lens material which is excellent in transparency and low in double refraction and has oxygen permeability is disclosed. Also, in Patent Document 2, a contact lens to which flexibility is given by forming a transparent gel is disclosed.

PRIOR ART DOCUMENTS

Patent Documents

Patent Document 1: JP2005-206699A
Patent Document 2: JP2006-199819A

DISCLOSURE OF INVENTION

Problem to be Solved by the Invention

However, in the contact lens material described in Patent Document 1, in the case where a block copolymer containing a polysiloxane skeleton and a polycarbonate skeleton are used, there is a problem that the material becomes hard reflecting the rigidity of its main chain and thus the expected flexibility for the contact lens material cannot be obtained.

Also, in the transparent gel and contact lens described in Patent Document 2, while a measure of flexibility arises due to the material being in the form of gel, there is a problem that the flexibility to such a degree that a wearing comfortableness can be obtained cannot be given.

It is an object of the present invention to provide a contact lens material being excellent in oxygen permeability and transparency, being capable of undergoing injection molding, having no water content and having flexibility, as well as to provide a contact lens gel material having excellent oxygen permeability and transparency. The "contact lens material" stated herein can be used as an artificial cornea which is placed inside of the body, or as a corneal onlay or a corneal inlay. Thus, the present invention provides a contact lens material within a broad range including the above-mentioned applications, and is not limited to a so-called contact lens.

Means to Solve the Problem

In a method of the present invention for producing a polycarbonate resin to be used as a contact lens material, by using, as a molecular weight control modifier, a monofunctional compound having a highly polar functional group such as alkyl hydroxybenzoate, alkyloxyphenol, hydroxyalkylphenol or the like but not a monofunctional compound such as p-tert-butylphenol, p-cumylphenol or alkyl-substituted phenol which is generally used as a molecular weight control modifier (chain terminator), properties of the polycarbonate resin can be changed significantly. Herein, by introducing a highly polar functional group including a hydroxyalkyl group, an ether group or an ester group, polarity of the polycarbonate resin itself can be improved, resulting in the improvement of surface property as a contact lens material and the significant improvement of solubility with other hydrophilic monomer. That is to say, the contact lens material having more superior optical performance and mechanical property can be obtained.

In other words, the present invention is a contact lens material comprising a polycarbonate resin derived from at least two compounds selected from a compound represented by the general formula (A), a compound represented by the general formula (B) and a compound represented by the general formula (C), a highly polar molecular weight control modifier (chain terminator) and a compound forming a carbonic acid ester, wherein the compound represented by the general formula (A) is essentially comprised;

[Chemical formula 1]

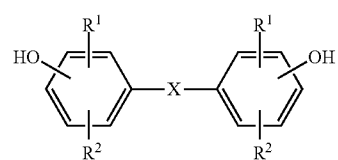
(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 2]

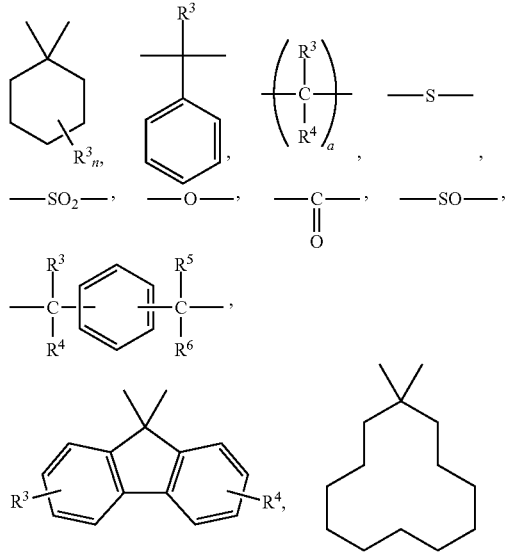

—SO$_2$—, —O—, —C(=O)—, —SO—, wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 3]

(B)

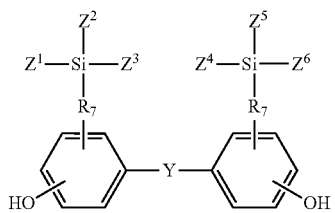

wherein $R^7$ is an aliphatic group of C1 to C6 or only denotes a bond, Y is a group shown by the formula:

[Chemical formula 4]

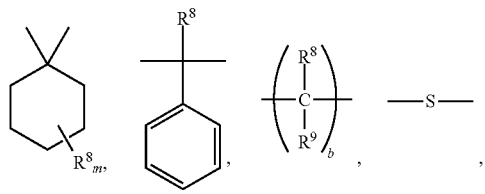

-continued

—SO$_2$—, —O—, —C(=O)—, —SO—,

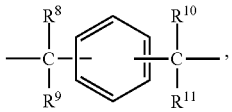

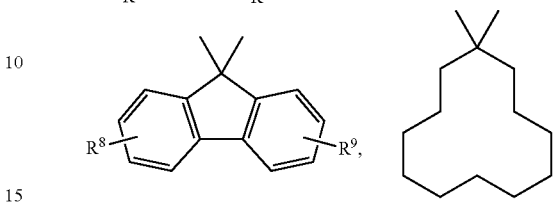

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 5]

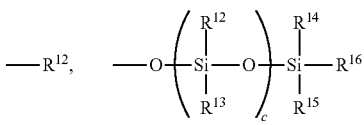

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, preferably each of $R^{12}$ to $R^{16}$ is a methyl group, a phenyl group or a butyl group, c is an integer of 0 to 100;

[Chemical formula 6]

(C)

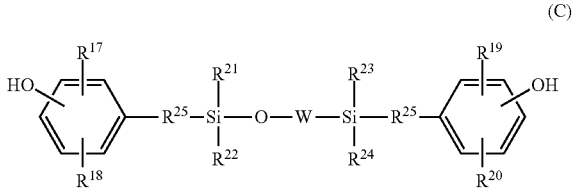

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —$SiO(R^{28})(R^{29})$— and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

The present invention also is a contact lens material comprising a transparent gel comprising a polycarbonate resin and a hydrophilic polymer obtained by polymerizing a hydrophilic monomer, wherein the polycarbonate resin is derived from at least two compounds selected from a compound represented by the general formula (A), a compound represented by the general formula (B) and a compound represented by the general formula (C), a highly polar molecular weight control modifier (chain terminator) and a compound forming a carbonic acid ester, and the compound represented by the general formula (A) is essentially comprised, and wherein the transparent gel has an interpenetrating network structure of the resin and the hydrophilic polymer.

Herein, the highly polar molecular weight control modifier (chain terminator) is preferably a compound represented by a general formula (D) and/or (E) and/or (F);

[Chemical formula 7]

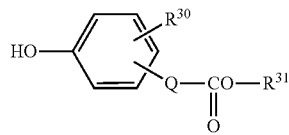

(D)

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 8]

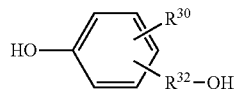

(E)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C6;

[Chemical formula 9]

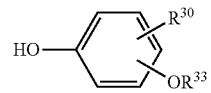

(F)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

The compound represented by the general formula (A) is preferably at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane Each of $R^{12}$ to $R^{16}$ in the general formula (B) is preferably a methyl group, a phenyl group or a butyl group.

The compound represented by the general formula (B) is preferably a compound represented by the general formula (B1) or a compound represented by the general formula (B2);

[Chemical formula 10]

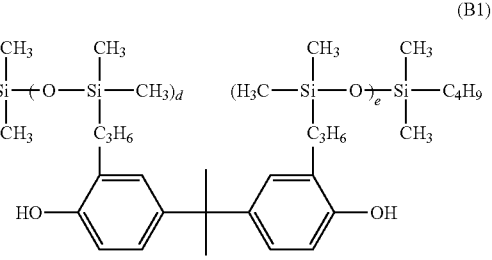

wherein each of d and e which denotes a repeat of silicone is an integer of 0 to 100;

[Chemical formula 11]

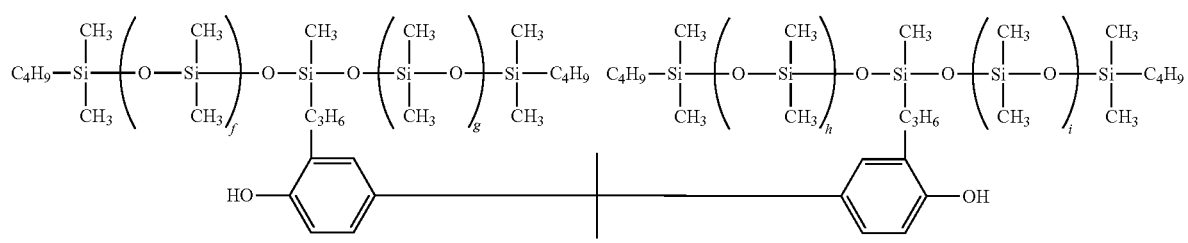

wherein each of f, g, h and i is an integer of 0 to 100.

The above hydrophilic monomer is preferably a monomer having a nitrogen atom.

The above monomer having a nitrogen atom is preferably N-vinyl pyrrolidone, N,N-dimethylacrylamide and/or N-methyl-3-methylidene pyrrolidone.

It is preferable that a ratio of the compound represented by the general formula (A) to the compound represented by the general formula (B) is 25:75 to 75:25 by weight.

It is preferable that a ratio of the compound represented by the general formula (A) to the compounds represented by the general formulas (B) and (C) is (A):(B+C)=25:75 to 75:25 by weight.

It is preferable that a ratio of the above polycarbonate resin to the above hydrophilic monomer is 5:95 to 40:60 by weight.

The present invention is a method for producing a polycarbonate resin derived from at least two compounds among a compound represented by the general formula (A), a compound represented by the general formula (B) and a compound represented by the general formula (C), a highly polar molecular weight control modifier (chain terminator) and a compound forming a carbonic acid ester, wherein the compound represented by the general formula (A) is essentially comprised;

[Chemical formula 12]

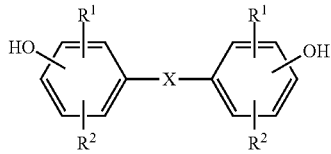

(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 13]

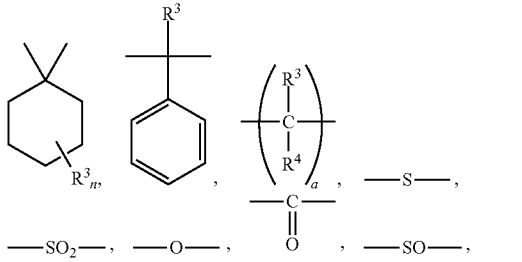

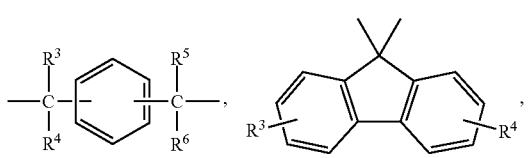

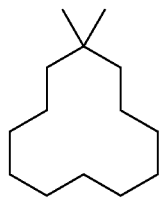

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 14]

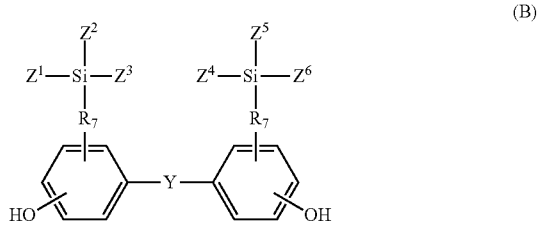

(B)

wherein $R^7$ is an aliphatic group of C1 to C6 or only denotes a bond, Y is a group shown by the formula:

[Chemical formula 15]

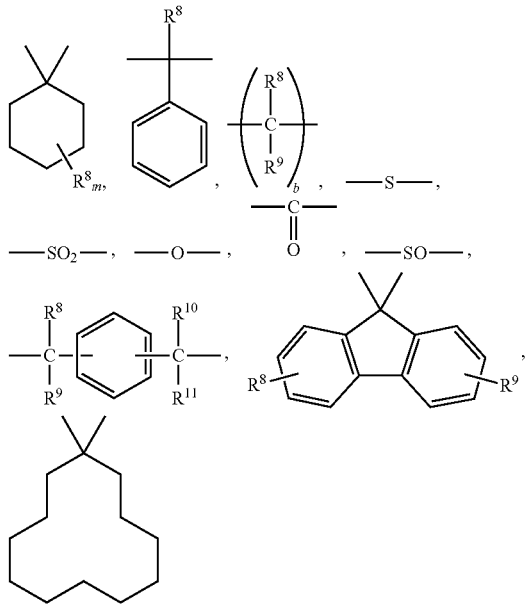

wherein each of $R^8$ and $R^9$ is a hydrogen atom or a group selected from the group consisting of an alkyl group, of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 16]

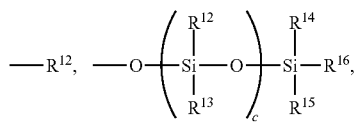

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, preferably, each of $R^{12}$ to $R^{16}$ is selected from a methyl group, a phenyl group and a butyl group, c is an integer of 0 to 100;

[Chemical formula 17]

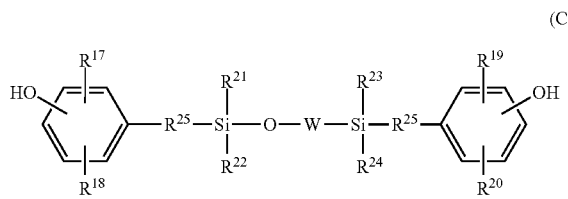

(C)

wherein each of $R^{17}$ to $R^{24}$ is independently a hydrogen atom, or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —$SiO(R^{26})(R^{27})$— and/or —$SiO(R^{28})(R^{29})$— and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

Herein, the highly polar molecular weight control modifier (chain terminator) is preferably a compound represented by a general formula (D) and/or (E) and/or (F);

[Chemical formula 18]

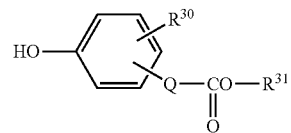

(D)

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 19]

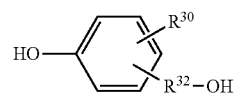

(E)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20;

[Chemical formula 20]

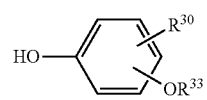

(F)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

Effect of the Invention

According to the present invention, a contact lens material being excellent in oxygen permeability and transparency, being capable of undergoing injection molding, having no water content and having flexibility, as well as a contact lens gel material having excellent oxygen permeability and transparency can be provided.

EMBODIMENT FOR CARRYING OUT THE INVENTION

The present invention is a contact lens material comprising a polycarbonate resin derived from the compound represented by the general formula (A), the compound represented by the general formula (B), the highly polar molecular weight control modifier (chain terminator) and the compound forming a carbonic acid ester.

The compound having a polycarbonate structure is not specifically limited and an example thereof is the compound represented by the following general formula (A):

[Chemical formula 21]

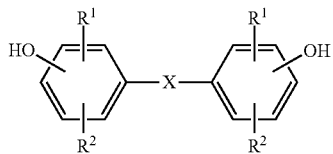

(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 22]

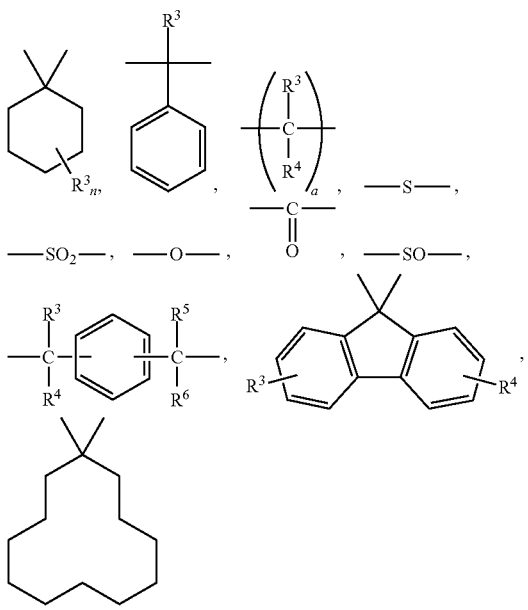

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4.

Specific examples of the compound (A) are 9,9-bis(4-hydroxyphenyl)fluorene, 9,9-bis(4-hydroxy-3-methylphenyl)fluorene, 9,9-bis(4-hydroxy-2-methylphenyl)fluorene, 4,4-biphenyldiol, bis(4-hydroxyphenyl)methane, bis(4-hydroxyphenyl)ether, bis(4-hydroxyphenyl)sulfone, bis(4-hydroxy-3-methylphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 1,1-bis(4-hydroxy-3-methylphenyl)cyclohexane, 1,1-bis(4-hydroxyphenyl)cyclododecane, 2,2-bis(4-hydroxy-3-methylphenyl)propane (dimethylbisphenol A), 2,2-bis(4-hydroxy-3,5-dimethylphenyl)propane, 1,1-bis(4-hydroxyphenyl)-1-phenylethane (bisphenol AP; BPAP), bis(4-hydroxyphenyl)diphenylmethane, 2,2-bis(4-hydroxy-3-allylphenyl)propane, 3,3,5-trimethyl-1,1-bis(4-hydroxyphenyl)cyclohexane, 9,9-bis(4-hydroxyphenyl)fluorene, 3,6-dimethyl-9,9-bis(4-hydroxyphenyl)fluorene, 9,9-bis(3-methoxy-4-hydroxyphenyl)fluorene, 9,9-bis(3-ethoxy-4-hydroxyphenyl)fluorene, 9,9-bis(3-ethyl-4-hydroxyphenyl)fluorene, 4,5-dimethyl-9,9-bis(4-hydroxyphenyl)fluorene, 9,9-bis-(3-phenyl-4-hydroxyphenyl)fluorene, 3,6-dimethyl-9,9-bis(3-methyl-4-hydroxyphenyl)fluorene, and 3,6-diphenyl-9,9-bis(4-hydroxyphenyl)fluorene. Among them, at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 1,1-bis(4-hydroxyphenyl)cyclohexane (bisphenol Z; BPZ), 1,1-bis(4-hydroxy-3-methylphenyl)cyclohexane, 1,1-bis(4-hydroxyphenyl)cyclododecane, 1,1-bis(4-hydroxyphenyl)-1-phenylethane (bisphenol AP; BPAP), and 3,3,5-dimethyl-1,1-bis(4-hydroxyphenyl)cyclohexane is particularly preferable in view of their good reactivity and producibility in an industrial scale and easy availability. They can be used in combination of two or more thereof.

The compound forming a polysiloxane structure is not specifically limited and an example thereof is the compound represented by the following general formula (B):

[Chemical formula 23]

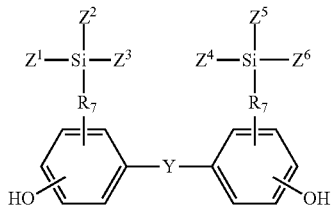

(B)

wherein $R^7$ is an aliphatic group of C1 to C6 or only denotes a bond, Y is a group shown by the formula:

[Chemical formula 24]

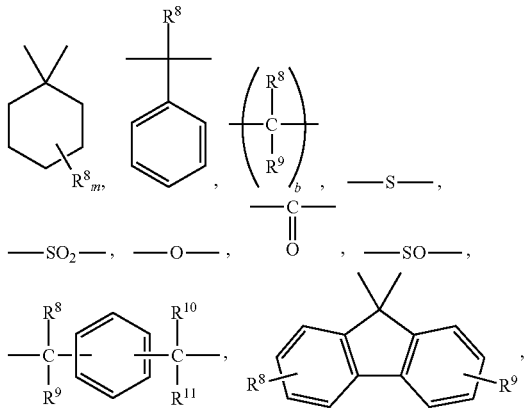

-continued

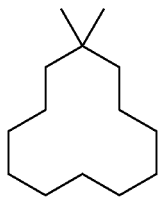

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 25]

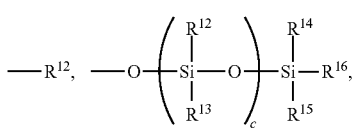

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, preferably, each of $R^{12}$ to $R^{16}$ are selected from a methyl group, a phenyl group and a butyl group, c is an integer of 0 to 100.

Specific examples of the compound (B) is a compound wherein each of $R^{12}$ to $R^{16}$ is a methyl group, a phenyl group or a butyl group, more specifically at least one selected from the compound represented by the general formula (B1) or the compound represented by the general formula (B2);

[Chemical formula 26]

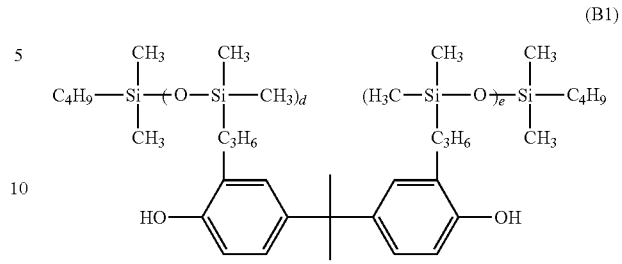

(B1)

wherein each of d and e is an integer of 0 to 100;

[Chemical formula 27]

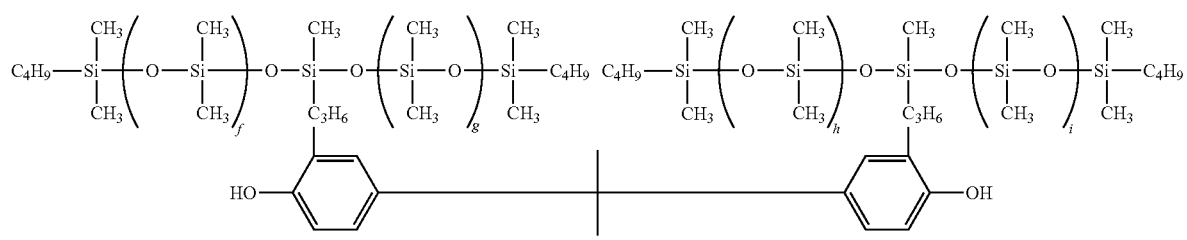

(B2)

wherein each of f, g, h and i is an integer of 0 to 100. Among them, a compound of (B1) wherein d=e=10, and a compound of (B2) wherein f=g=h=i=10 are preferable in view of their good reactivity and producibility in an industrial scale and easy availability. These compounds can be used in combination of two or more thereof.

A ratio of the polysiloxane structure to the polycarbonate structure in the copolymer is preferably 25:75 to 75:25 by weight, more preferably 40:60 to 70:30 by weight. When the polysiloxane structure is less than 25 wt % and the polycarbonate is more than 75 wt %, rigidity tends to be in excess for the use as a soft contact lens, and also the desired oxygen permeability tends to be unobtainable for the use as a contact lens material. When the polysiloxane structure is more than 75 wt % and the polycarbonate is less than 25 wt %, strength tends to be decreased.

The copolymer having the polysiloxane structure and the polycarbonate structure is derived, for example, from the compound (A), the compound (B) and a compound forming a carbonic acid ester.

Examples of the compound forming a carbonic acid ester are phosgene, bis-aryl carbonates such as diphenyl carbonate, di-p-tolylcarbonate, phenyl-p-tolylcarbonate, di-p-chlorophenylcarbonate and dinaphthylcarbonate, and the like. Those compounds can be used in combination of two or more thereof. Among them, phosgene and diphenyl carbonate are particularly preferable from the viewpoint of good reactivity and producibility at a low cost.

The amount of the compound forming a carbonic acid ester to be used is 1.0 to 2.0 mole, preferably 1.2 to 1.5 mole per one mole of the total bisphenols. When the amount of the compound forming a carbonic acid ester to be used is less than 1.0 mole, the molecular weight cannot be increased up to the desired molecular weight and thus no polymer can be formed, and when it is more than 2.0 mole, the compound forming a carbonic acid ester which is not used in polymerization remains in the polymer, whereby a bad influence tends to be given to the quality of the polymer.

As a method for producing the copolymer by reacting the above compound (A) and the above compound (B) with the compound forming a carbonic acid ester, a known method for producing a polycarbonate derived from a bisphenol A can be adopted. For instance, a direct reaction of a bisphenol compound and phosgene (a phosgene method), an ester exchange reaction (a transesterification method) of a bisphenol compound and a bis-aryl carbonate, or the like can be adopted. Comparing the phosgene method with the ester exchange method, the former is preferable from the viewpoint of the reactivity of the compound (A) and the compound (B).

In the phosgene method, generally, the compound (A) and the compound (B) are reacted with phosgene in the presence of an acid coupling agent and a solvent. As the acid coupling agent, for example, pyridine and alkaline metal hydroxides such as sodium hydroxide and potassium hydroxide are used. As the solvent, for example, dichloromethane, chloroform, chlorobenzene, xylene and the like are used. Further, in order to accelerate condensation polymerization reaction, a tertiary amine catalyst such as triethylamine can be used, and in order to control a degree of polymerization, a monofunctional compound such as phenol, p-tert-butylphenol, p-cumylphenol, an alkyl-substituted phenol and the like can be added as a molecular weight control modifier. Further, if necessary, an anti-oxidant such as sodium sulfite or sodium hydrosulfite, and a branching agent such as phloroglucin, isatin bisphenol, 1,1,1-tris(4-hydroxyphenyl)ethane, or α,α',α"-tris(4-hydroxyphenyl)-1,3,5-triisopropyl benzene may be added in a small amount. The reaction temperature is generally 0-150° C. preferably 5-40° C. The reaction time depends upon the reaction temperature, and is generally 0.5 minutes to 10 hours, preferably 1 minute to 2 hours. Further, pH in the reaction system is desirably kept at 10 or more during the reaction.

On the other hand, in the ester exchange method, the compound (A) and the compound (B) in the present invention are mixed with a bis-aryl carbonate and reacted with each other under reduced pressure at a high temperature. In this step, a monofunctional compound such as p-tert-butylphenol, p-cumylphenol, or an alkyl-substituted phenol may be added as a molecular weight control modifier. Further, in case of necessity, an anti-oxidant and a branching agent may be added. The reaction is conducted generally at 150-350° C., preferably 200-300° C., and phenols originated from the above-mentioned bis-aryl carbonates and produced by the ester exchange reaction are distilled off from the reaction system by reducing the pressure preferably finally down to 1 mmHg or lower. The reaction time depends upon the reaction temperature and a degree of reduced pressure, and is generally about 1 to 10 hours. The reaction is preferably conducted under atmosphere of an inert gas such as nitrogen or argon.

In the case of adopting the phosgene method in the present invention, it is possible to blow phosgene in the presence of a quaternary ammonium salt in order to conduct the reaction efficiently. Specific examples of the quaternary ammonium salt are tetramethyl ammonium chloride, trimethylbenzyl ammonium chloride, triethylbenzyl ammonium chloride, tetraethyl ammonium bromide, tetra-n-butyl ammonium iodide, etc., and among them, trimethylbenzyl ammonium chloride and triethylbenzyl ammonium chloride are preferable. The quaternary ammonium salt is preferably used in an amount of generally 0.0005-5 mole % relative to the total bisphenols used.

The highly polar molecular weight control modifier (chain terminator) used for changing the property of the polycarbonate to be prepared is not specifically limited and examples thereof are compounds represented by the general formulas (D) and/or (E) and/or (F).

[Chemical formula 28]

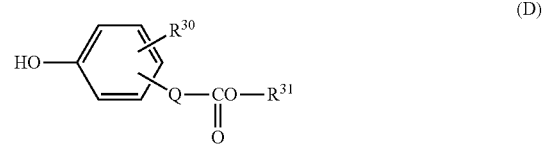

(D)

Wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20.

Specific examples of the compound represented by the general formula (D) are alkyl hydroxybenzoates such as butyl hydroxybenzoate, octyl hydroxybenzoate, nonyl hydroxybenzoate, decanyl hydroxybenzoate, dodecyl hydroxybenzoate and heptadecanyl hydroxybenzoate.

[Chemical formula 29]

(E)

Wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20.

Specific examples of the compound represented by the general formula (E) are phenols having hydroxyalkyl group such as p-hydroxybenzyl alcohol or p-hydroxyphenethyl alcohol.

[Chemical formula 30]

(F)

Wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

Specific examples of the compound represented by the general formula (F) are alkyloxyphenols such as butoxyphenol, octyloxyphenol, nonyloxyphenol, decanyloxyphenol, dodecyloxyphenol, tetradecanyloxyphenol, heptadecanyloxyphenol and octadecanyloxyphenol. Those compounds can be used in combination of two or more thereof.

The amount of the highly polar molecular weight control modifier (chain terminator) to be used is 0.1-50 mole %, preferably 0.5-10 mole % relative to the total bisphenols.

The intrinsic viscosity of the contact lens material of the present invention (polycarbonate resin) is preferably within a range of 0.1-1.0 dL/g. Particularly, in the case where a high cycle molding is required, the preferable range is 0.13-0.6 dL/g, and more preferable range is 0.15-0.4 dL/g. When it is less than 0.1 dL/g, mold release failure and warping tend to occur, and when it is more than 1.0 dL/g, fluidity is poor and thus insufficient filling into a mold and generation of a flow mark tend to occur.

When producing the contact lens material of the present invention, high grade purification is preferred as in a conventional polycarbonate resin for an optical disk. Specifically, the purification is carried out so as to comply as much as possible with such criteria that substantially no dust having a diameter of not less than 50 μm is found, the number of dusts having a diameter of 0.5-50 μm is not more than $3 \times 10^4$, an inorganic and organic residual chlorine content is not more than 2 ppm, a residual alkaline metal content is not more than 2 ppm, a residual hydroxyl group content is not more than 200 ppm, a residual nitrogen content is not more than 5 ppm, a residual monomer content is not more than 20 ppm, etc. Further, in order to remove a low molecular product and a solvent, a post-treatment such as extraction can sometimes be conducted. Also, regarding the starting materials such as the compound (A), the compound (B) and the compound forming a carbonic acid ester, those from which impurities and isomers were reduced as much as possible are preferably used.

When producing the contact lens of the present invention, according to necessity for keeping stability and releasability, a hindered phenol type and phosphite type antioxidant; a lubricating agent and a releasing agent such as a silicone, a fatty acid ester, a fatty acid, a fatty acid glyceride and a natural oil and fat such as bees wax; a benzotriazole type, a benzophenone type, a dibenzoyl methane type and a salicylate type photo stabilizer; an antistatic agent such as a polyalkylene glycol and a fatty acid glyceride may be optionally added.

For the purpose of the reduction in cost and recycling, it is further possible to use a conventional bisphenol A type polycarbonate optionally to such an extent not to impair the performance of the contact lens. In addition to the above physical properties as a molding material, it is specifically desirable for getting a clear visual acuity in contact lens that a double refraction of a 30° slant incident light is not higher than 50 nm, preferably not higher than 25 nm, and a visible light transmittance is at least not less than 60%, preferably not less than 90%. With respect to the property of the contact lens material, in order to assure safety in wearing a contact lens, oxygen permeability is desirably not less than $50 \times 10^{-11}$ (cm$^2$/sec)·(mLO$_2$/(mL·mmHg)), further not less than $70 \times 10^{-11}$ (cm$^2$/sec)·(mLO$_2$/(mL·mmHg)) for continuous use.

In the case of producing a contact lens from the contact lens material of the present invention, the contact lens material is molded into a lens blank having a button shape of a 10-15 mm outer diameter and a 2-5 mm thickness, and then the molded article is processed to a lens by a conventional lathing method, a photo processing with laser or the like. As the contact lens material of the present invention is excellent in moldability and low in double refraction, molding into a shape similar to a lens is also possible. In this process, a flanged portion may be provided on a periphery of the lens for processing. In any case, it is necessary to produce a molded article having molding distortion inhibited as much as possible and not to use a part accompanied with distortion as a contact lens. Further, the a contact lens material can be subjected to a plasma treatment or a glow discharge treatment under atmospheric or reduced pressure in order to improve surface wettability. Still further, a graft polymerization may be conducted.

Embodiment 1

A contact lens material according to Embodiment 1 of the present invention can be used for RGP (Rigid Gas Permeable) lens.

A method for producing the contact lens material according to Embodiment 1 of the present invention is explained as follows.

The method for producing the contact lens material according to Embodiment 1 of the present invention is a method for producing a contact lens material comprising a polycarbonate resin derived from a compound represented by the general formula (A), a compound represented by the general formula (B), a highly polar molecular weight control modifier (chain terminator) and a compound forming carbonic acid ester;

[Chemical formula 31]

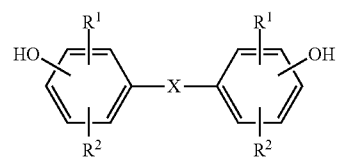

(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 32]

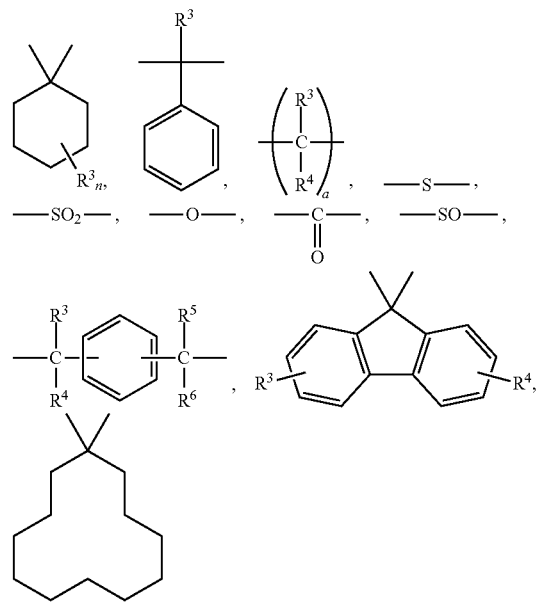

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 33]

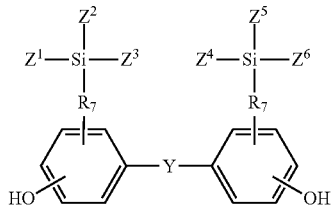

(B)

wherein $R^7$ is an aliphatic group of C1 to C6 or only denotes a bond, Y is a group shown by the formula:

[Chemical formula 34]

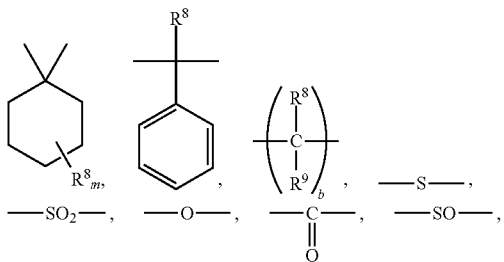

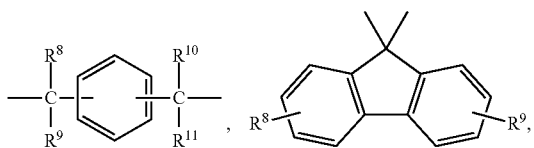

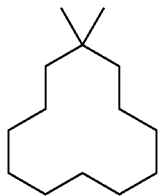

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 35]

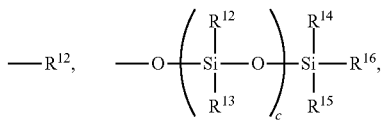

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, preferably each of $R^{12}$ to $R^{16}$ is selected from a methyl group, a phenyl group and a butyl group, c is an integer of 0 to 100.

Herein, the highly polar molecular weight control modifier (chain terminator) is preferably the compound represented by the general formula (D) and/or (E) and/or (F);

[Chemical formula 36]

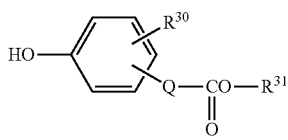

(D)

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 37]

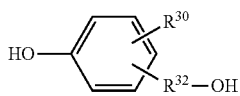

(E)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20;

[Chemical formula 38]

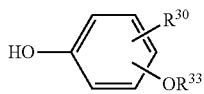

(F)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

Hereinafter, specifically synthesis examples are shown.

Synthesis Example 1

In 450 mL of a 7.9% (w/w) aqueous solution of sodium hydroxide were dissolved 48.8 g of 1,1-bis(4-hydroxyphenyl)cyclohexane (hereinafter referred to as BPZ), 48.8 g of the polyorganosiloxane compound having the following structure [chemical formula 39], and 0.1 g of sodium hydrosulfite. Thereto was added 350 mL of methylene chloride and 29 g of phosgene was blown at 1.28 g/min with agitating at 20° C. After the blowing was complete, 3.0 g of dodecyl p-hydroxybenzoate (hereinafter referred to as POB-C12) and 100 mL of a 7.9% (w/w) aqueous solution of sodium hydroxide were added thereto, followed by vigorous agitation for 10 minutes, and 0.4 mL of triethylamine was further added and the resulting mixture was agitated for 40 minutes to conduct polymerization.

The polymer liquid was separated into an aqueous phase and an organic phase, and the organic phase was neutralized by using phosphoric acid, and washed with water repeatedly until an electrical conductivity of the water reached 10 μS/cm or lower, whereby a purified resin solution was obtained. The purified resin solution obtained was dropped slowly into warm water of 65° C. under vigorous agitation, and a solvent was removed, whereby the polymer was solidified. The solid was filtrated, and dried to give a white powdery polymer. This polymer had an intrinsic viscosity [η] of 0.24 dL/g at 20° C. in the methylene chloride solution of this polymer having the concentration of 0.5 g/dL. As the result of infrared absorption spectrum analysis, it was shown that the obtained polymer had absorption in the vicinity of 1770 cm$^{-1}$ originated from a carbonyl group, and absorption in the vicinity of 1240 cm$^{-1}$ originated from an ether bond, whereby the polymer was confirmed to have a carbonate bond. And it was shown that the polymer barely had absorption originated from a hydroxyl group in the vicinity of 3650-3200 cm$^{-1}$. As the result of GPC analysis, any of monomers in this polymer was 20 ppm or less. Considering all the various factors together, this polymer was confirmed as a polycarbonate polymer having the following structure unit.

[Chemical formula 39]

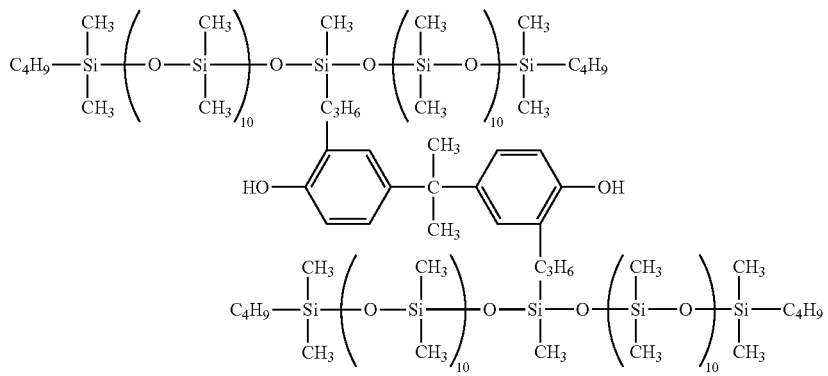

[Chemical formula 40]

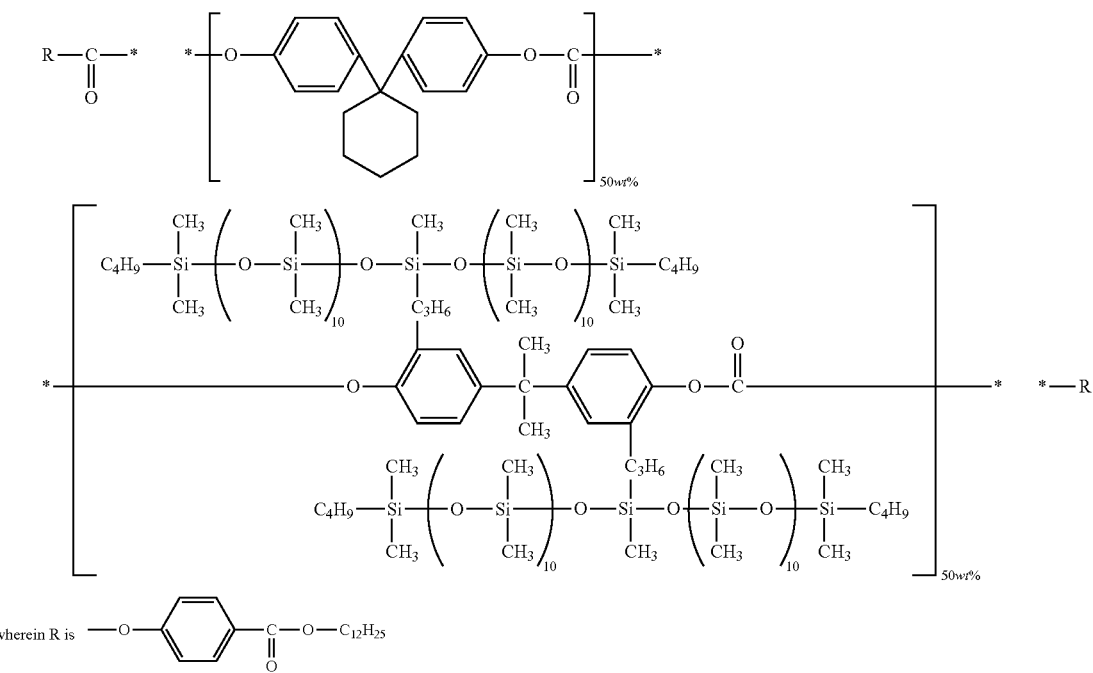

Embodiment 2

Furthermore, the present invention is a contact lens material comprising the polycarbonate resin derived from the compound represented by the general formula (A), the compound represented by the general formula (C), the highly polar molecular weight control modifier (chain terminator) and the compound forming a carbonic acid ester;

[Chemical formula 41]

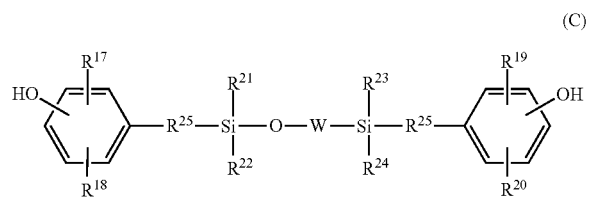
(C)

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and the polymerization degree thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

The polymerization degree of W moiety is 0 to 200, preferably 10 to 150. When the polymerization degree is more than 200, transparency and strength tend to be decreased.

Each of $R^{21}$ to $R^{24}$ in the general formula (C) is preferably a methyl group or a phenyl group for maintaining oxygen permeability and refraction index.

Examples of the compound represented by the general formula (C) are specifically those shown by the following structural formulas:

[Chemical formula 42]

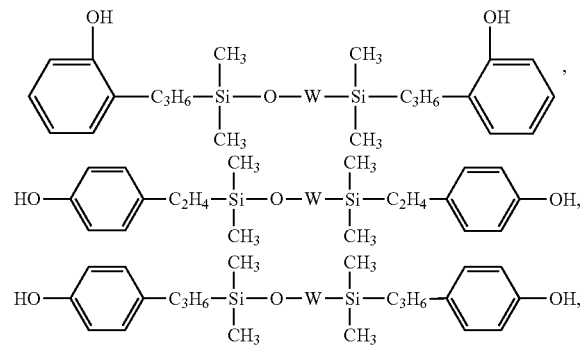

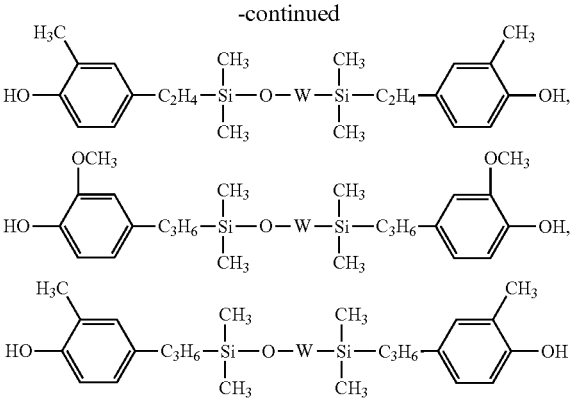

wherein W is one comprising a plurality of the following blocks randomly bound;

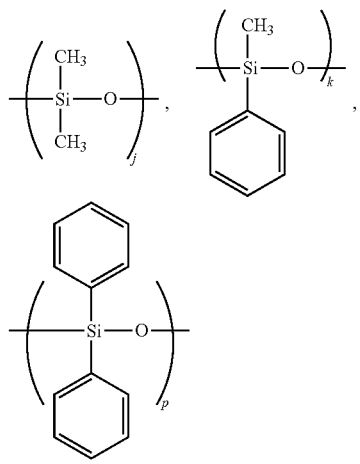

wherein $j \geq 0$, $k \geq 0$, $p \geq 0$, $200 \geq (j+k+p) \geq 0$.

The compounds represented by the general formula (C) can be used in combination of two or more thereof. Preferably, W is in particular a homopolymer or a random copolymer comprising 1 to 100 moieties of dimethylsiloxane and/or diphenylsiloxane. Among them, particularly a random copolymer of dimethylsiloxane having 3-(o-hydroxyphenyl) propyl group in α and ω positions and diphenylsiloxane or α,ω-bis[3-(o-hydroxyphenyl)propyl]polydimethylsiloxane is preferable in view of oxygen permeability, refraction index and transparency.

A ratio of the polysiloxane structure to the polycarbonate structure in the copolymer, in other words, a ratio of the compound represented by the general formula (A) to the compound represented by the general formula (C) is preferably (A):(C)=25:75 to 75:25, more preferably 40:60 to 70:30 by weight. When the polysiloxane structure is less than 25 wt % and the polycarbonate is more than 75 wt %, rigidity tends to be in excess for the use as a soft contact lens, and also the desired oxygen permeability tends to be unobtainable for the use as a contact lens material. When the polysiloxane structure is more than 75 wt % and the polycarbonate is less than 25 wt %, strength tends to be decreased.

The compound represented by the general formula (A), the compound represented by the general formula (D), the compound represented by the general formula (E), the compound represented by the general formula (F) and the compound forming a carbonic acid ester are the same as those in Embodiment 1 and therefore their explanations are left out.

The method for producing the contact lens material according to Embodiment 2 of the present invention is explained as follows.

The method for producing the contact lens material according to Embodiment 2 of the present invention is a method for producing a contact lens material comprising the polycarbonate resin derived from the compound represented by the general formula (A), the compound represented by the general formula (C), the highly polar molecular weight control modifier (chain terminator) and the compound forming carbonic acid ester;

[Chemical formula 43]

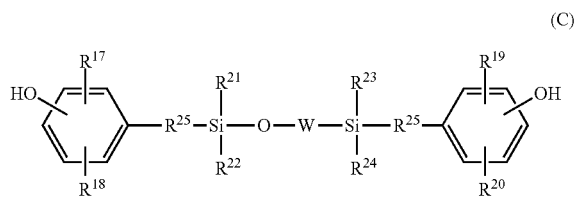

(C)

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of $-SiO(R^{26})(R^{27})-$ and/or $-SiO(R^{28})(R^{29})-$ and the polymerization degree thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

Hereinafter, specifically synthesis examples are shown.

Synthesis Example 2

A polymer was synthesized in the same manner as in Synthesis Example 1 except that 48.8 g of 1,1-bis(4-hydroxyphenyl)-2-phenylethane (hereinafter referred to as BPAP) was used instead of BPZ, 73.2 g of the polyorganosiloxane having the following structure [chemical formula 44] was used instead of the polyorganosiloxane having the structure of [chemical formula 39], and the amount of Phosgene was changed to 30.0 g, and the amount of POB-C12 was changed to 4.3 g.

[Chemical formula 44]

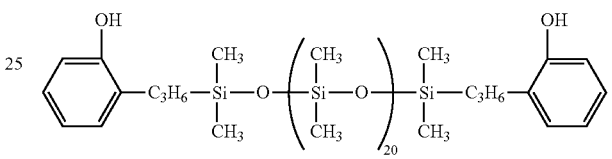

Intrinsic viscosity [η] of the obtained polymer was 0.30 dL/g, and as the result of infrared absorption spectrum analysis and others, this polymer was confirmed as a polycarbonate polymer having the following structure unit.

[Chemical formula 45]

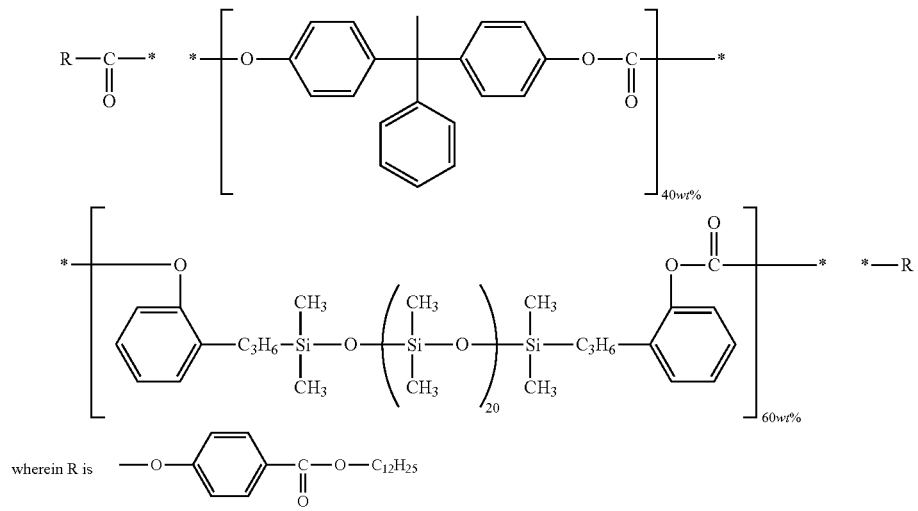

Synthesis Example 3

A polymer was synthesized in the same manner as in Synthesis Example 1 except that the amount of BPZ was changed to 24.4 g, 24.4 g of 9,9-bis(4-hydroxy-3-methylphenyl)fluorene (hereinafter referred to as BCFL) was used, 73.2 g of the polyorganosiloxane having the structure of [chemical formula 44] was used instead of the polyorganosiloxane having the structure of [chemical formula 39], and the amount of Phosgene was changed to 28 g and the amount of POB-C12 was changed to 3.2 g. Intrinsic viscosity [η] of the obtained polymer was 0.16 dL/g, and as the result of infrared absorption spectrum analysis and others, this polymer was confirmed as a polycarbonate polymer having the following structure unit.

[Chemical formula 46]

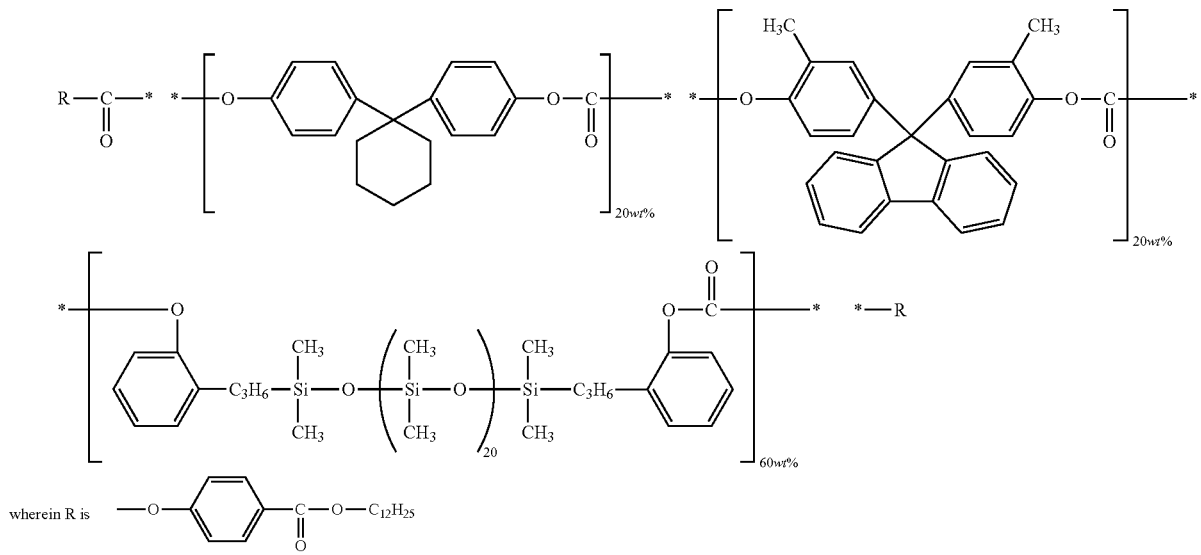

Synthesis Example 4

A polymer was synthesized in the same manner as in Synthesis Example 1 except that 5.5 g of benzyl triethylammonium chloride (hereinafter referred to as TEBAC), 68.7 g of BCFL instead of BPZ, 103.1 g of the polyorganosiloxane having the following structure [chemical formula 47] instead of the polyorganosiloxane having the structure of [chemical formula 39], 42 g of Phosgene, and 3.2 g of butyl p-hydroxybenzoate (hereinafter referred to as POB-C4) instead of POB-C12 were added to 550 mL of a 7.9% (w/w) aqueous solution of sodium hydroxide. Intrinsic viscosity [η] of the obtained polymer was 0.20 dL/g, and as the result of infrared absorption spectrum analysis and others, this polymer was confirmed as a polycarbonate polymer having the following structure unit.

[Chemical formula 47]

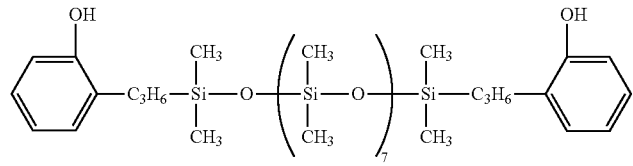

[Chemical formula 48]

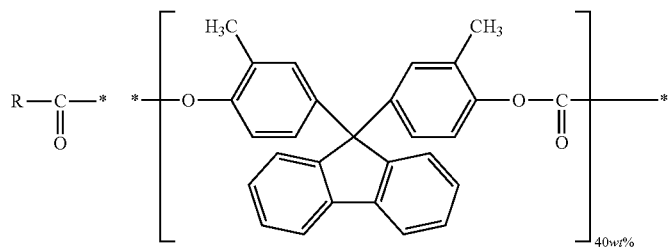

-continued

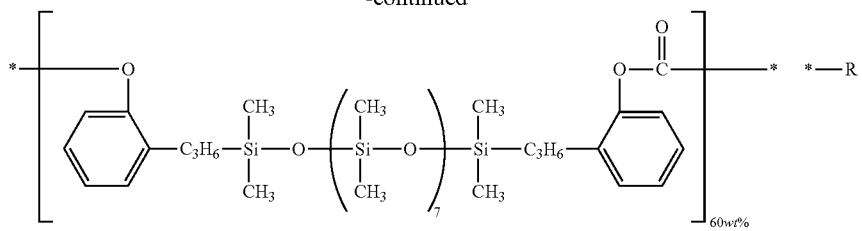

wherein R is 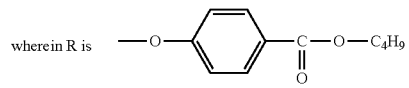

Synthesis Example 5

A polymer was synthesized in the same manner as in Synthesis Example 1 except that 1.0 g of TEBAC was used, 48.8 g of BPAP was used instead of BPZ, 73.2 g of the polyorganosiloxane having the structure of [chemical formula 44] was used instead of the polyorganosiloxane having the structure of [chemical formula 39], 11.5 g of p-hydroxyphenetyl alcohol (hereinafter referred to as PHPhOH) was used instead of POB-C12 and the amount of a 7.9% (w/w) aqueous solution of sodium hydroxide was changed to 450 mL. Intrinsic viscosity [η] of the obtained polymer was 0.21 dL/g, and as the result of infrared absorption spectrum analysis and others, this polymer was confirmed as a polycarbonate polymer having the following structure unit.

Synthesis Example 6

A polymer was synthesized in the same manner as in Synthesis Example 1 except that 0.1 g of TEBAC was used, 48.4 g of 1,1-bis(4-hydroxyphenyl)cyclododecane (hereinafter referred to as BPCD) was used instead of BPZ, 48.8 g of the polyorganosiloxane having the structure of [chemical formula 44] was used instead of the polyorganosiloxane having the structure of [chemical formula 39], the amount of Phosgene was changed to 24 g, 0.8 g of p-tert-butylphenol (hereinafter referred to as PTBP) was used instead of POB-C12, and the amount of a 7.9% (w/w) aqueous solution of sodium hydroxide was changed to 650 mL. Intrinsic viscosity [η] of the obtained polymer was 0.33 dL/g, and as the result of

[Chemical formula 49]

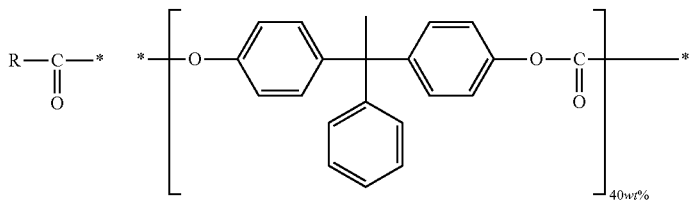

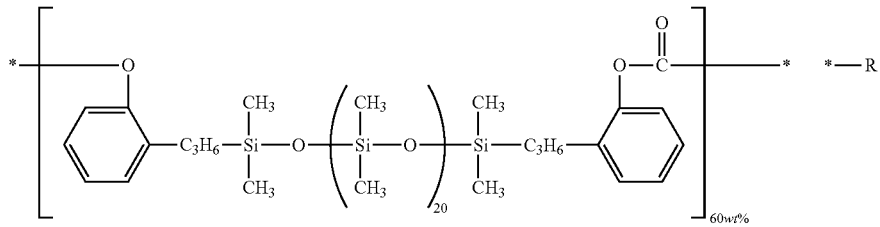

wherein R is 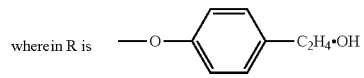

The following are examples of a method for synthesis of polycarbonate without using a highly polar molecular weight control modifier (chain terminator) as comparative examples.

infrared absorption spectrum analysis and others, this polymer was confirmed as a polycarbonate polymer having the following structure unit.

[Chemical formula 50]

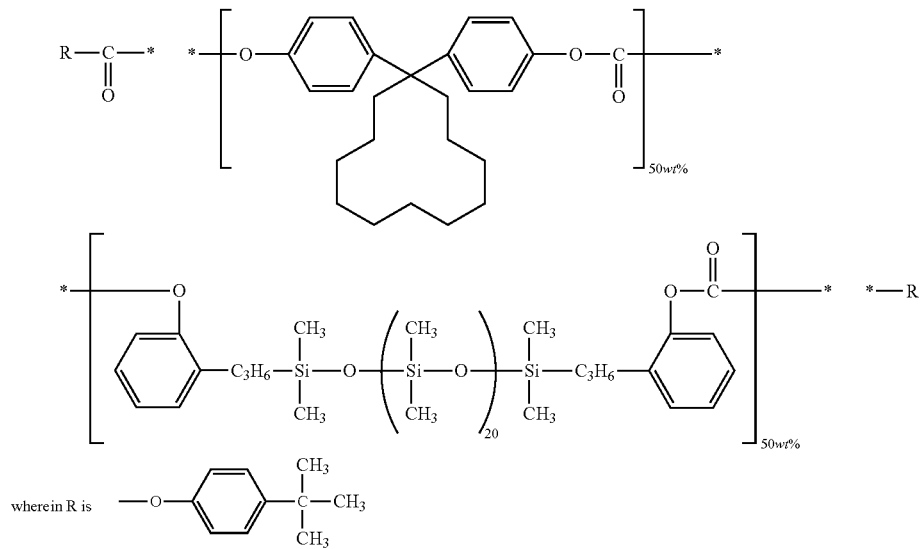

Synthesis Example 7

A polymer was synthesized in the same manner as in Synthesis Example 1 except that 0.1 g of TEBAC was used, 61.0 g of BCFL was used instead of BPZ, 61.0 g of the polyorganosiloxane having the structure of [chemical formula 44] was used instead of the polyorganosiloxane having the structure of [chemical formula 39], 1.7 g of PTBP was used instead of POB-C12, and the amount of a 7.9% (w/w) aqueous solution of sodium hydroxide was changed to 550 mL. Intrinsic viscosity [η] of the obtained polymer was 0.32 dL/g, and as the result of infrared absorption spectrum analysis and others, this polymer was confirmed as a polycarbonate polymer having the following structure unit.

Synthesis Example 8

A polymer was synthesized by using 450 mL of a 7.9% (w/w) aqueous solution of sodium hydroxide in the same manner as in Synthesis Example 1 except that 0.1 g of TEBAC was used, 61.0 g of 1,1-bis(4-hydroxy-3-methylphenyl)cyclohexane (hereinafter referred to as OCZ) was used instead of BPZ, 61.0 g of the polyorganosiloxane having the structure of [chemical formula 44] was used instead of the polyorganosiloxane having the structure of [chemical formula 39], the amount of Phosgene was changed to 36 g, and 1.9 g of PTBP was used instead of POB-C12. Intrinsic viscosity [η] of the obtained polymer was 0.35 dL/g, and as the result of infrared absorption spectrum analysis and others, this polymer was confirmed as a polycarbonate polymer having the following structure unit.

[Chemical formula 51]

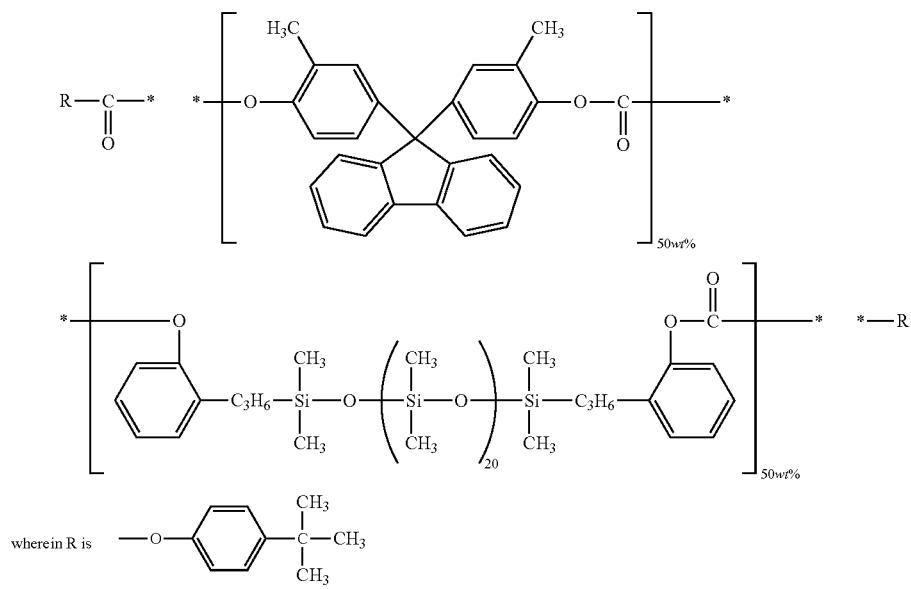

[Chemical formula 52]

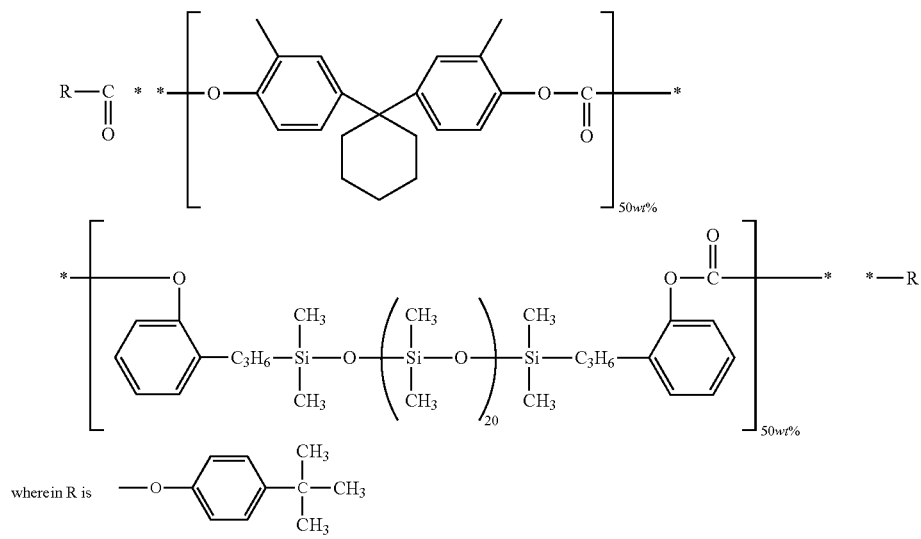

Embodiment 3

The present invention is a contact lens material comprising the polycarbonate resin derived from the compound represented by the general formula (A), the compound represented by the general formula (B), the compound represented by the general formula (C), the highly polar molecular weight control modifier (chain terminator) and the compound forming carbonic acid ester.

The compounds represented by the general formulas (A), (B) and (C) and the compounds represented by the general formula (D), (E) and (F) used as the highly polar molecular weight control modifier (chain terminator), as well as the compound forming a carbonic acid ester are the same as those in Embodiments 1 and 2 and therefore their explanations are left out.

The method for producing the contact lens material according to Embodiment 3 of the present invention is explained as follows.

The method for producing the contact lens material according to Embodiment 3 of the present invention is a method for producing the contact lens material comprising the polycarbonate resin derived from the compound represented by the general formula (A), the compound represented by the general formula (B), and further the compound represented by the general formula (C), the highly polar molecular weight control modifier (chain terminator) and the compound forming a carbonic acid ester.

Hereinafter, specifically synthesis examples are shown.

Synthesis Example 9

A polymer was synthesized in the same manner as in Synthesis Example 1 except that 24.4 g of the polyorganosiloxane having the structure of [chemical formula 44] was used instead of the polyorganosiloxane having the structure of [chemical formula 39], 24.4 g of the polyorganosiloxane having the following structure [chemical formula 53] was used, and 1.7 g of p-butoxyphenol (hereinafter referred to as PBOP) was used instead of POB-C12. Intrinsic viscosity [η] of the obtained polymer was 0.33 L/g, and as the result of infrared absorption spectrum analysis and others, this polymer was confirmed as a polycarbonate polymer having the following structure unit.

[Chemical structure 53]

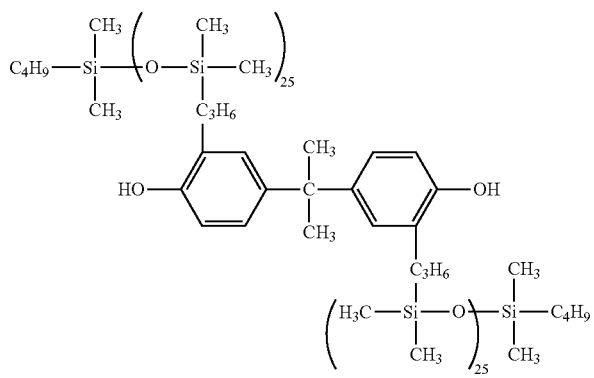

[Chemical structure 54]

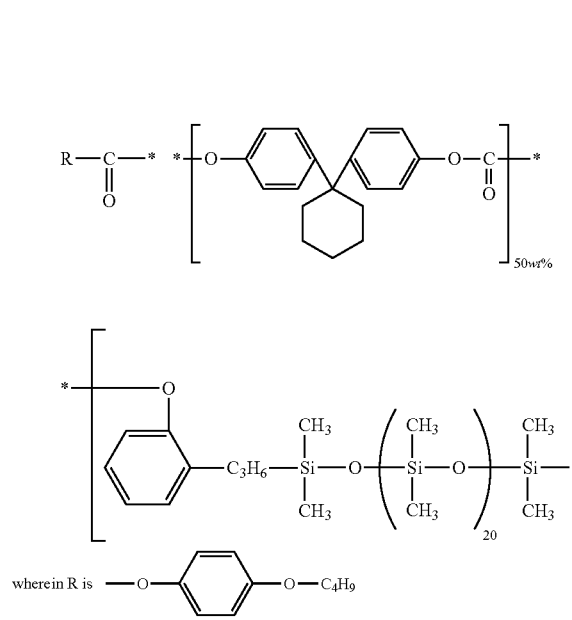
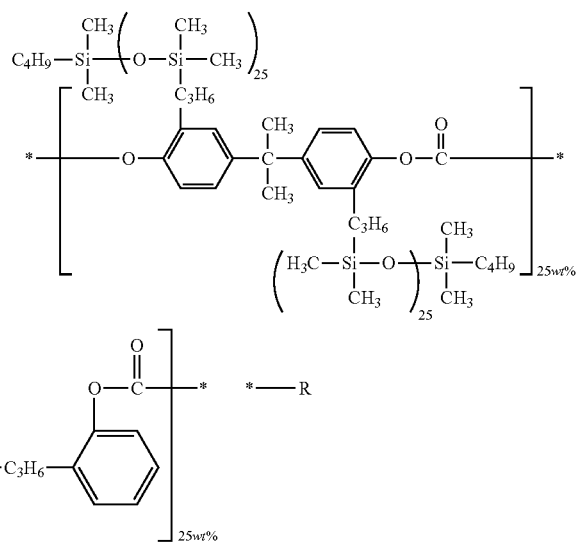

wherein R is —O—⟨phenyl⟩—O—C₄H₉

Embodiment 4

Furthermore, the present invention is the contact lens material comprising a transparent gel comprising a polycarbonate resin and a hydrophilic polymer obtained by polymerizing a hydrophilic monomer, wherein the polycarbonate resin is derived from at least two compounds selected from the compound represented by the general formula (A), the compound represented by the general formula (B) and the compound represented by the general formula (C), the highly polar molecular weight control modifier (chain terminator) and the compound forming a carbonic acid ester, and the compound represented by the general formula (A) is essentially comprised, and wherein the transparent gel has an interpenetrating network structure of the resin and the hydrophilic polymer.

The term of "transparency" in the present invention means visible light transmittance (% T) is 60% or more. Also, the interpenetrating network structure means such a structure that the resin and the hydrophilic monomer are forming the network basket, whereby it becomes possible to supply oxygen to eye through the apertures thereof.

The hydrophilic monomer used in the present invention is not specifically limited and examples thereof are monomers having a nitrogen atom such as N-vinyl pyrrolidone, N,N-dimethylacrylamide and N-methyl-3-methylidene pyrrolidone, mathacrylic acid, hydroxyethyl(meth)acrylate and the like. Among them, a monomer having a nitrogen atom, particularly N-vinyl pyrrolidone, N,N-dimethylacrylamide and N-methyl-3-methylidene pyrrolidone are preferable in view of the prevention of white turbidity by suppressing phase-separation structure during polymerization. Those hydrophilic monomers can be used in combination of two or more thereof.

In the present invention, a ratio of the polycarbonate resin to the hydrophilic monomer is preferably 5:95 to 40:60 by weight, more preferably 10:90 to 30:70 by weight. When the polycarbonate resin is less than 5 wt % and the hydrophilic monomer is more than 95 wt %, the effect of the present invention by the polycarbonate resin tends to be unobtainable. Further, mixing the polycarbonate resin with the hydrophilic monomer increases viscosity, and thus when the polycarbonate resin is more than 40 wt % and the hydrophilic monomer is less than 60 wt %, the resultant tends to be rigid even though transparency and oxygen permeability are satisfactory.

A crosslinking agent may be added to the mixture obtained by dissolving the polycarbonate resin in the hydrophilic monomer in order to give a reinforcing effect. As the crosslinking agent, a conventional one can be used, and ethylene glycol di(meth)acrylate, allyl methacrylate and diethylene glycol diallyl ether are preferable because of an effect of increasing transparency of the obtained material. Those can be used alone or in combination of two or more thereof. When the crosslinking agent is used, the amount thereof is preferably not less than 0.1 wt % relative to the whole mixture for the purpose of exhibiting desired reinforcing effect, preferably not more than 10 wt % for the purpose of preventing stretch as hydrogel from reducing and rigidness thereof from increasing too much.

In the mixture, there may be further incorporated a silicone-containing monomer other than the compound (B) and a solvent. Examples of the solvent are tetrahydrofuran, isopropanol, acetone, hexane and the like.

Furthermore, a polymerizable or non-polymerizable ultraviolet absorbent, a polymerizable dyestuff and a polymerizable ultraviolet absorbing dyestuff can be used as a component for providing the contact lens material with ultraviolet absorbing property or for coloring the material.

In the present invention, the above polycarbonate resin has no polymerizable group, and thus shrinkage in its volume caused by polymerization can be suppressed. Therefore, satisfactory polymerization can be conducted even in a resin mold. For the polymerization, a conventional polymerization initiator such as a heat polymerization initiator or a photo polymerization initiator is used.

In the case of producing a hydrogel from the polycarbonate resin of the present invention, similarly to Embodiment 1, a composition containing the polycarbonate resin is hardened to a lens blanks having a button shape of 10-15 mm outer diameter and 2-5 mm thickness, and then the resultant is processed to a lens by a conventional lathing method, a photo processing with laser or the like. As the polycarbonate resin of the present invention is excellent in moldability and low in double refraction, molding of the composition containing the polycarbonate resin into a shape similar to a lens is also possible. In this process, a flanged portion may be provided on a periphery of the lens for processing. In any case, it is necessary to produce a molded article having molding distortion inhibited as much as possible and not to use a part accompanied with distortion as a contact lens. Further, a contact lens comprising the polycarbonate resin can be subjected to a plasma treatment or a glow discharge treatment under atmospheric or reduced pressure in order to improve surface wettability. Still further, a graft polymerization may be conducted.

The compounds represented by the general formulas (A), (B) and (C) and the compounds represented by the general formulas (D), (E) and (F) used as a highly polar molecular weight control modifier (chain terminator), as well as the compound forming carbonic acid ester are the same as those in Embodiments 1 to 3 and therefore their explanations are left out.

EXAMPLES

Examples 1 to 4 and comparative examples 1 to 3

Powders shown in Table 1 were placed in a mold (made of brass) for molding into a plate shape in an amount of about 1 g. And then, press molding was conducted at 180° C. to 300° C. for 2 to 3 minutes under 5 to 10 kg/cm² pressure. The obtained plates were subjected to the below evaluations.

<Measurement of Shore D Hardness>

Using Shore D hardness durometer GS-720G available from TECLOCK Corporation, hardness of plates having a thickness of about 5 mm was measured under the environment at 25° C. at 50%.

<Results of Evaluation of Pressed Plate>

From the results in Table 1, it is observed that because the plates obtained by the present invention have low hardness, the plates have excellent flexibility. On the other hand, plates molded by comparative examples have too high hardness for contact lens, thereby less wearing comfortableness can be easily expected.

<Property> Feeling of a film having a diameter of 17 mm and a thickness of about 0.4 mm was functionally evaluated by fingers.

⊚: Very flexible

○: Flexible

Δ: Flexible and moderately hard

X Rigid

<Measurement of Light Transmittance (% T)>

A light transmittance of a wave length between 380 to 780 nm of the plate was measured in saline by using a ultraviolet-visible spectrophotometer UV-3150 made by Shimadzu Corporation to calculate a light transmittance in terms of a thickness of 0.15 mm.

<Oxygen Permeability (Dk)>

An oxygen permeability was measured by using a GAS-TO-GAS method with a GTG analyzer made by REHDER DEVELOPMENT Co., Ltd. The measuring unit was $\times 10^{-11}$ (cm²/second)·(mLO₂/(mL·mmHg)).

Composition of powder used for molding and evaluation results are shown in Table 1.

TABLE 1

|  | EXAMPLE | | | | COMPARATIVE EXAMPLE | | |
| --- | --- | --- | --- | --- | --- | --- | --- |
|  | 1 | 2 | 3 | 4 | 1 | 2 | 3 |
| Polycarbonate | | | | | | | |
| Synthesis Example | 1 | 2 | 5 | 9 | 6 | 7 | 8 |
| General formula (A) | A1 | A4 | A4 | A1 | A3 | A2 | A5 |
| General formula (B) | B2 | — | — | B1 | — | — | — |
|  | (f, g, h, i = 10) | | | (d, e = 25) | | | |
| General formula (C) | — | C1(l = 20) | C1(l = 20) | C1(l = 20) | C1(l = 20) | C1(l = 20) | C1(l = 20) |
| Ratio of each component (A:B:C) | 50:50:0 | 40:0:60 | 40:0:60 | 50:25:25 | 50:0:50 | 50:0:50 | 50:0:50 |
| Chain terminator* | POB-C12 | POB-C12 | PHPhOH | PBOP | PTBP | PTBP | PTBP |
| Press temperature (° C.) | 180 | 220 | 220 | 180 | 300 | 220 | 220 |
| Shore D hardness | 24 | 23 | 10 | 31 | 60 | 68 | 55 |
| Property | ○ | ⊚ | ○ | ○ | — | Δ | Δ |
| % T | 96.3 | 96.7 | 84.3 | 94.5 | — | 99 | 57.9 |
| Dk | 90 | 119 | 92 | 105 | — | 90 | 79 |

*POB-C12: dodecyl p-hydroxybenzoate

POB-C4: butyl p-hydroxybenzoate

PHPhOH: p-hydroxyphenethyl alcohol

PBOP: n-butoxyphenol

PTBP: t-butylphenol

[Chemical formula 55]

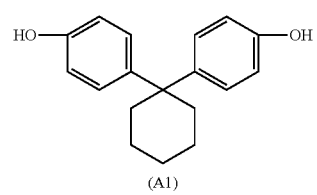

(A1)

TABLE 1-continued
|  | EXAMPLE | | | | COMPARATIVE EXAMPLE | | |
|---|---|---|---|---|---|---|---|
|  | 1 | 2 | 3 | 4 | 1 | 2 | 3 |
[Chemical formula 56]
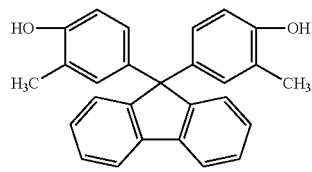
(A2)
[Chemical formula 57]
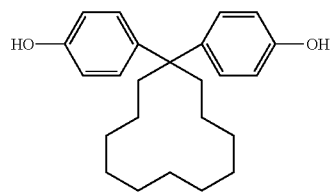
(A3)
[Chemical formula 58]
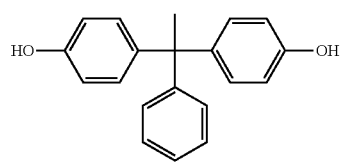
(A4)
[Chemical formula 59]
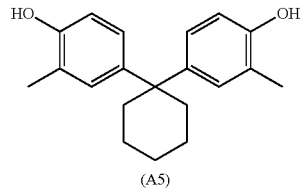
(A5)
[Chemical formula 60]
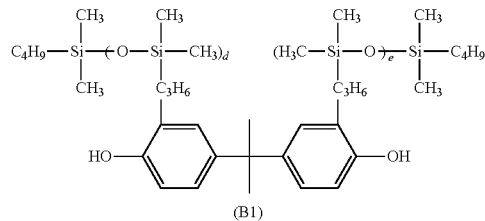
(B1)
[Chemical formula 61]
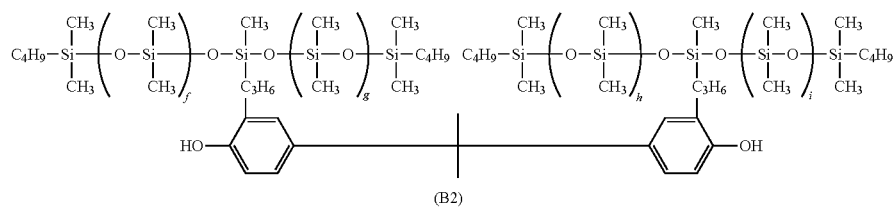
(B2)
[Chemical formula 62]
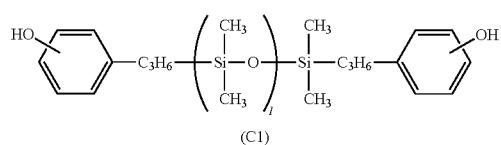
(C1)

Examples 6 to 11 and comparative examples 4 to 6

Components shown in Table 2 are injected into a mold in the shape of a plate having a periphery of about 20 mm in an amount of about 100 and then photo polymerization was conducted for 20 minutes by irradiating UV rays to this mold to obtain plates. The resulting polymers were subjected to the below evaluations.

<Measurement of Light Transmittance (% T)>

A light transmittance of a wave length between 380 to 780 nm of the plate was measured in saline by using a ultraviolet-visible spectrophotometer UV-3150 made by Shimadzu Corporation to calculate a light transmittance in terms of a thickness of 0.08 mm.

<Oxygen Permeability (Dk)>

An oxygen permeability of the gel was measured in saline by an electrode method with an oxygen permeation measurement machine K-316 made by Rika Seiki Kogyo K.K.

<Water Content (WC) (%)>

After hydration of the gel, its surface was lightly wiped and the weight was measured (W1: g). The gel was placed in a drier of 105° C. for 16 hours or more, and then taken out from the drier to slowly cool to a room temperature in a desiccator, and weights of the dried gel was measured (W2: g). The water contents were calculated by the following equation:

$$WC = (W1 - W2)/W1$$

<Young's Modulus>

The hydrated gel was processed into a dumbbell shape and a tensile test was conducted using a multi-role tester 4300 made by Instron Co., Ltd., to determine Young's Modulus.

<Evaluation Results of Gel>

From the result in Table 2, it is observed that all the gels obtained by the present invention are transparent and flexible and have excellent Dk value. On the other hand, Comparative Examples 4 and 6 have luminous transmittance of not more than 50%, whereby it is understood that the gels of Comparative Examples 4 and 6 are less transparent. Also, in Comparative Examples 4 to 6, the mixture for producing a contact lens has a significantly high viscosity, whereby it is understood that the solubility of the polycarbonate and the hydrophilic monomer is poor. The mixture having a high viscosity causes a major problem in manufacturing that air bubble easily enters a lens when producing the lens, and therefore such mixture is not suitable for a contact lens.

Composition of powder used for gel and evaluation results are shown in Table 2.

TABLE 2

| | EXAMPLE | | | | | |
|---|---|---|---|---|---|---|
| | 6 | 7 | 8 | 9 | 10 | 11 |
| Polycarbonate | | | | | | |
| Synthesis Example | 1 | 2 | 3 | 4 | 5 | 9 |
| General formula (A) | A1 | A4 | A1/A2 | A2 | A4 | A1 |
| General formula (B) | B2(f, g, h, i = 10) | — | — | — | — | B1(d, e = 25) |
| General formula (C) | — | C1(l = 20) | C1(l = 20) | C1(l = 7) | C1(l = 20) | C1(l = 20) |
| Ratio of each component (A:B:C) | 50:50:0 | 40:0:60 | 20/20:0:60 | 40:0:60 | 40:0:60 | 50:25:25 |
| Chain terminator | POB-C12 | POB-C12 | POB-C12 | POB-C4 | PHPhOH | PBOP |
| Component | | | | | | |
| PCSi | 30 | 30 | 30 | 30 | 30 | 30 |
| NVP | 70 | 70 | 70 | 70 | 70 | 70 |
| TRIAM | 0.5 | 0.5 | 0.5 | 0.5 | 0.5 | 0.5 |
| D.1173 | 0.5 | 0.5 | 0.5 | 0.5 | 0.5 | 0.5 |
| Viscosity (mPa · s) | 537 | 585 | 144 | 181 | 246 | 523 |
| % T | 98.8 | 97.4 | 95.5 | 60.7 | 88.2 | 99.1 |
| Dk | 49 | 81 | 69 | 66 | 78 | 81 |
| Water Content (%) | 71 | 86 | 83 | 79 | 89 | 79 |
| Young's Modulus (MPa) | 0.61 | 0.06 | 0.19 | 0.48 | 0.05 | 0.06 |

| | COMPARATIVE EXAMPLE | | |
|---|---|---|---|
| | 4 | 5 | 6 |
| Polycarbonate | | | |
| Synthesis Example | 6 | 7 | 8 |
| General formula (A) | A3 | A2 | A5 |
| General formula (B) | — | — | — |
| General formula (C) | C1(l = 20) | C1(l = 20) | C1(l = 20) |
| Ratio of each component (A:B:C) | 50:0:50 | 50:0:50 | 50:0:50 |
| Chain terminator | PTBP | PTBP | PTBP |
| Component | | | |
| PCSi | 30 | 30 | 30 |
| NVP | 70 | 70 | 70 |
| TRIAM | 0.5 | 0.5 | 0.5 |
| D.1173 | 0.5 | 0.5 | 0.5 |
| Viscosity (mPa · s) | 1240 | 1720 | 1090 |
| % T | 33.2 | 97.2 | 34.9 |
| Dk | 76 | 63 | 80 |
| Water Content (%) | 73 | 69 | 83 |
| Young's Modulus (MPa) | 5.14 | 4.6 | 0.75 |

The invention claimed is:

1. A contact lens material comprising a polycarbonate resin derived from at least two compounds selected from a compound represented by a general formula (A), a compound represented by a general formula (B) and a compound represented by a general formula (C), a highly polar molecular weight control modifier (chain terminator) and a compound forming a carbonic acid ester, wherein the compound represented by the general formula (A) is essentially comprised;

[Chemical formula 1]

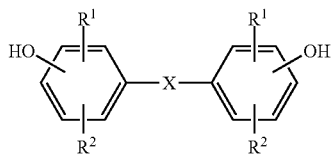
(A)

wherein, each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 2]

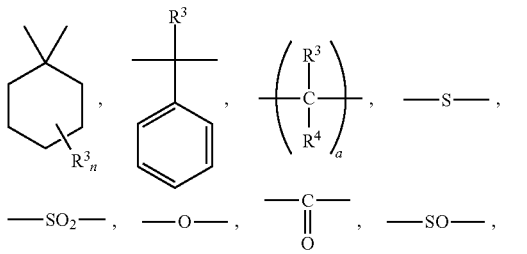

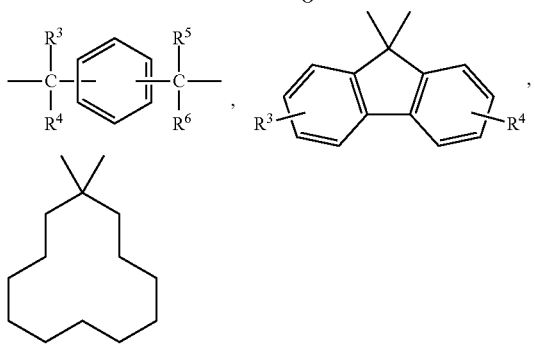

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 3]

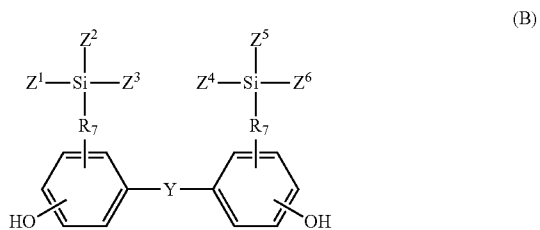
(B)

wherein $R^7$ is an aliphatic group of C1 to C6 or only denotes a bond, Y is a group shown by the formula:

[Chemical formula 4]

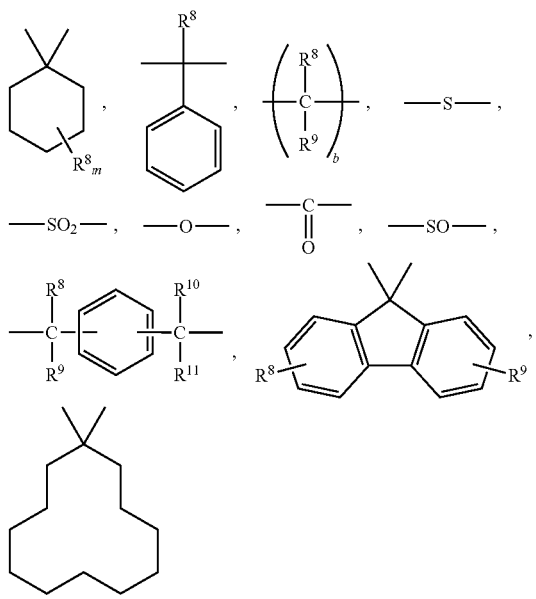

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 5]

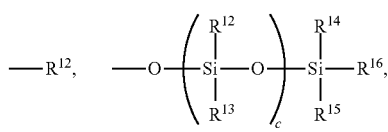

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

[Chemical formula 6]

(C)

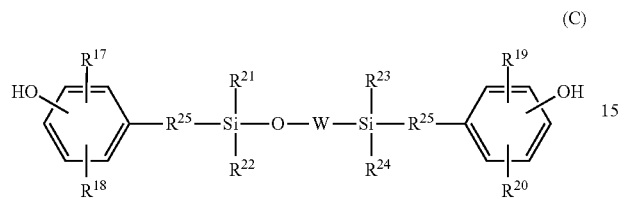

wherein, each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and a polymerization degree thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

2. A contact lens material comprising a transparent gel comprising a polycarbonate resin and a hydrophilic polymer obtained by polymerizing a hydrophilic monomer, wherein the polycarbonate resin is derived from at least two compounds selected from a compound represented by a general formula (A), a compound represented by a general formula (B) and a compound represented by a general formula (C), a highly polar molecular weight control modifier (chain terminator) and a compound forming a carbonic acid ester, and the compound represented by the general formula (A) is essentially comprised, and wherein the transparent gel has an interpenetrating network structure of the resin and the hydrophilic polymer;

[Chemical formula 1]

(A)

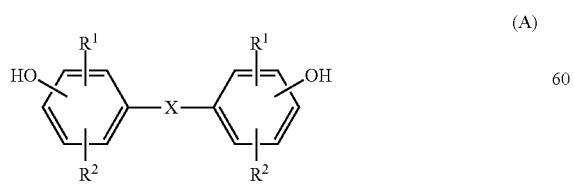

wherein, each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 2]

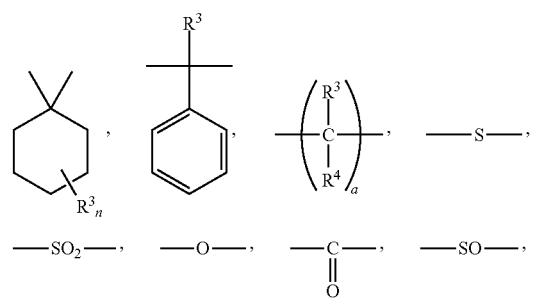

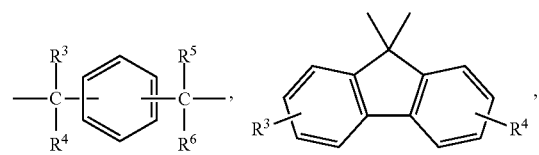

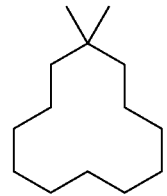

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 3]

(B)

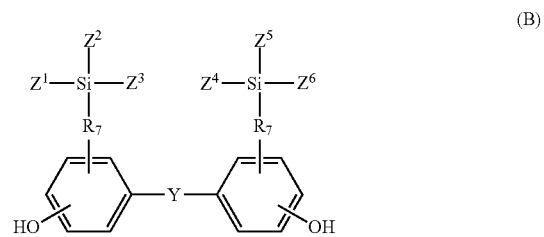

wherein $R^7$ is an aliphatic group of C1 to C6 or only denotes a bond, Y is a group shown by the formula:

[Chemical formula 4]

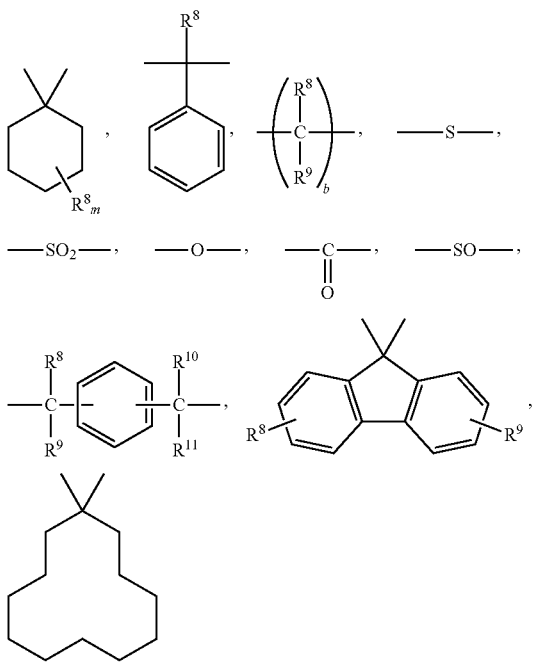

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 5]

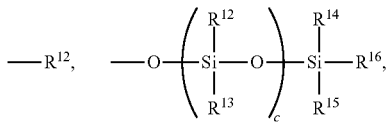

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

[Chemical formula 6]

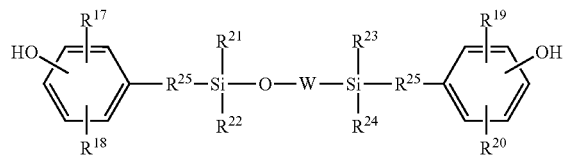

wherein, each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and a polymerization degree thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

3. The contact lens material according to claim 1, wherein the highly polar molecular weight control modifier (chain terminator) is a compound represented by a general formula (D) and/or (E) and/or (F);

[Chemical formula 7]

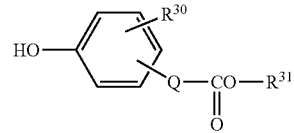

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 8]

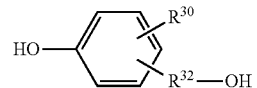

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20;

[Chemical formula 9]

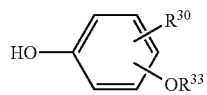
(F)

wherein R$^{30}$ is a hydrogen atom or a group selected from the group consisting of an alkyl group of C1 to C10, an alkenyl group of C2 to C10, an alkoxy group of C1 to C10 and an aryl group of C6 to C12, R$^{33}$ is a hydrocarbon group of C1 to C20.

4. The contact lens material according to claim 1, wherein the compound represented by the general formula (A) is at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane.

5. The contact lens material according to claim 1, wherein each of R$^{12}$ to R$^{16}$ in the general formula (B) is a methyl group, a phenyl group or a butyl group.

6. The contact lens material according to claim 1, wherein the compound represented by the general formula (B) is a compound represented by a general formula (B1) or a compound represented by a general formula (B2);

[Chemical formula 10]

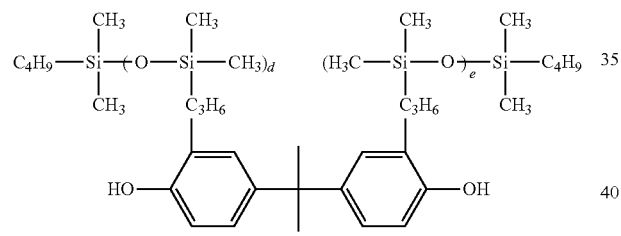
(B1)

wherein each of d and e which denotes a repeat of silicone is an integer of 0 to 100;

[Chemical formula 11]

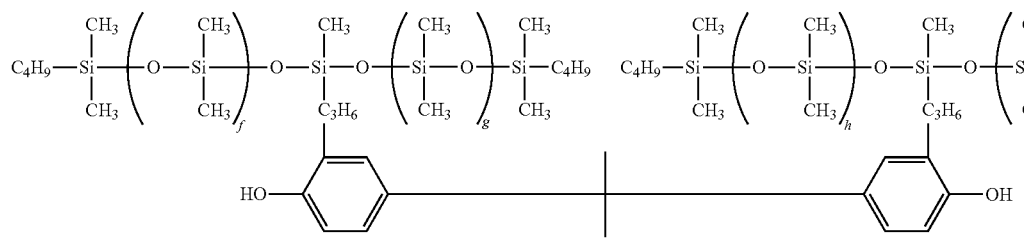
(B2)

wherein each of f, g, h and i is an integer of 0 to 100.

7. The contact lens material according to claim 2, wherein the hydrophilic monomer is a monomer having a nitrogen atom.

8. The contact lens material according to claim 7, wherein the monomer having a nitrogen atom is N-vinyl pyrrolidone, N,N-dimethylacrylamide and/or N-methyl-3-methylidene pyrrolidone.

9. The contact lens material according to claim 1, wherein a ratio of the compound represented by the general formula (A) to the compound represented by the general formula (B) is 25:75 to 75:25 by weight.

10. The contact lens material according to claim 1, wherein a ratio of the compound represented by the general formula (A) to the compounds represented by the general formulas (B) and (C) is (A):(B+C)=25:75 to 75:25 by weight.

11. The contact lens material according to claim 2, wherein a ratio of the polycarbonate resin to the hydrophilic monomer is 5:95 to 40:60 by weight.

12. The contact lens material according to claim 1, wherein an amount of the highly polar molecular weight control modifier (chain terminator) to be added is 0.1-50 mole % relative to the total bisphenols.

13. The contact lens material according to claim 1 wherein an amount of the highly polar molecular weight control modifier (chain terminator) to be added is 0.5-10 mole % relative to the total bisphenols.

14. A method for producing a contact lens comprising a polycarbonate resin derived from at least two compounds among a compounds represented by a general formula (A), a compound represented by a general formula (B) and a compound represented by a general formula (C), a highly polar molecular weight control modifier (chain terminator) and a compound forming a carbonic acid ester, wherein the compound represented by the general formula (A) is essentially comprised;

[Chemical formula 12]

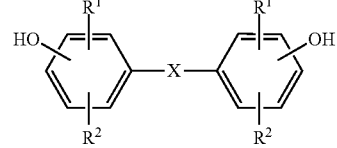
(A)

wherein, each of R$^1$ and R$^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 13]

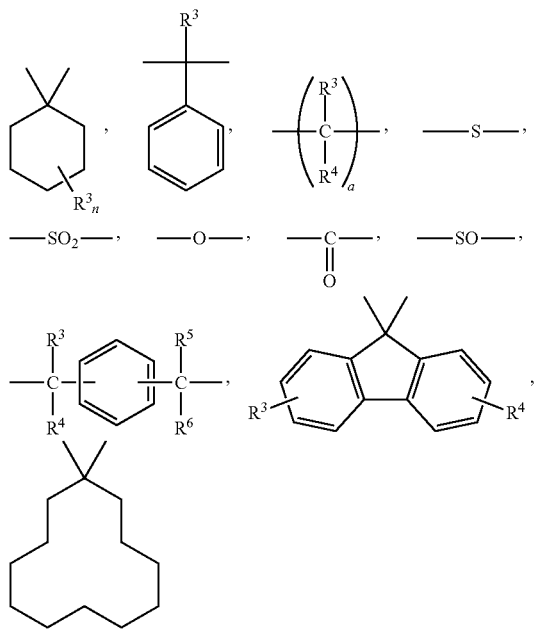

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 14]

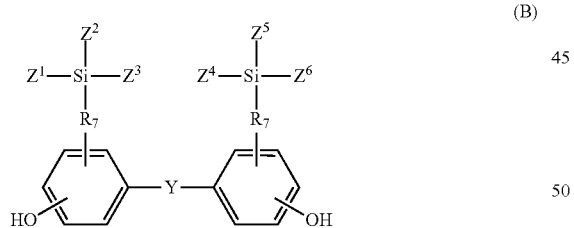

(B)

wherein $R^7$ is an aliphatic group of C1 to C6 or only denotes a bond, Y is a group shown by the formula:

[Chemical formula 15]

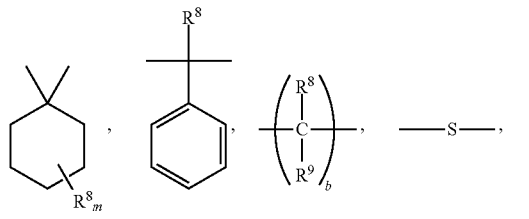

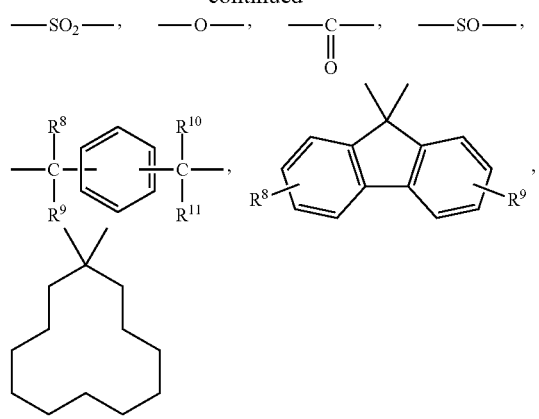

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 16]

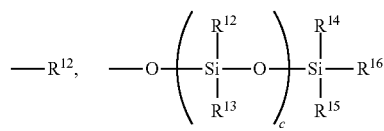

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

[Chemical formula 17]

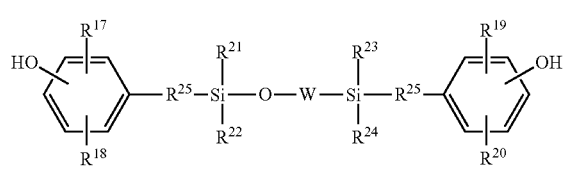

(C)

wherein, each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and a polymerization degree thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

15. A method for producing a contact lens material comprising a transparent gel comprising a polycarbonate resin and a hydrophilic polymer obtained by polymerizing a hydrophilic monomer, wherein the polycarbonate resin is derived from at least two compounds selected from a compound represented by a general formula (A), a compound represented by a general formula (B) and a compound represented by a general formula (C), a highly polar molecular weight control modifier (chain terminator) and a compound forming a carbonic acid ester, and the compound represented by the general formula (A) is essentially comprised, and wherein the transparent gel has an interpenetrating network structure of the resin and the hydrophilic polymer;

[Chemical formula 12]

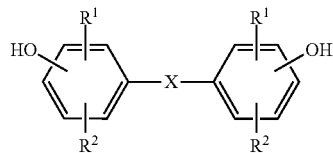
(A)

wherein, each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 13]

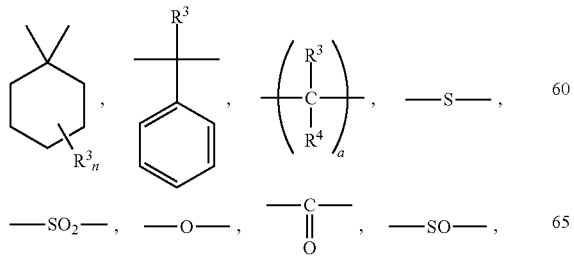

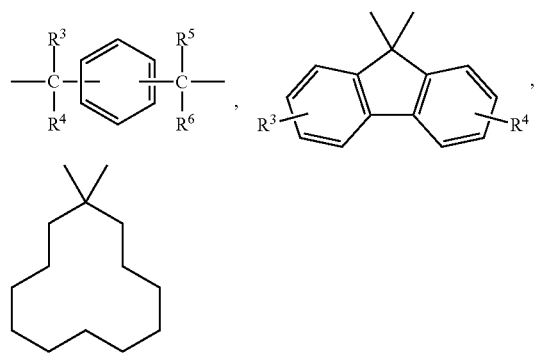

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 14]

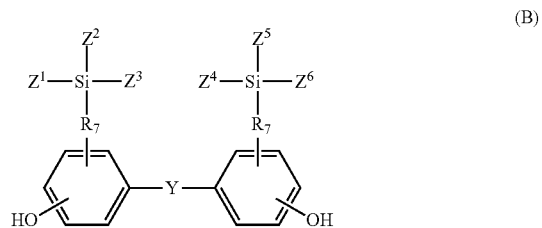
(B)

wherein $R^7$ is an aliphatic group of C1 to C6 of only denotes a bond, Y is a group shown by the formula:

[Chemical formula 15]

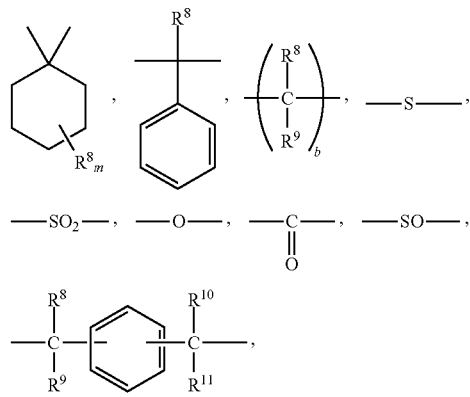

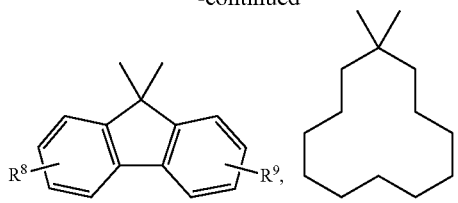

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 16]

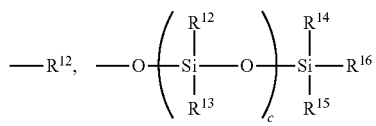

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

[Chemical formula 17]

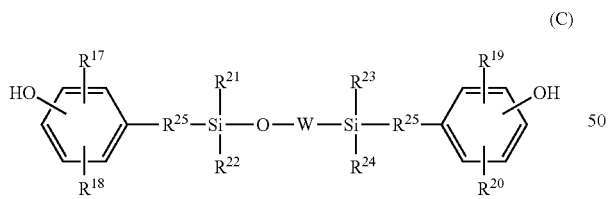

wherein, each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of $-SiO(R^{26})(R^{27})-$ and/or $-SiO(R^{28})(R^{29})-$ and a polymerization degree thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

16. The method for producing a contact lens material according to claim 14, wherein the highly polar molecular weight control modifier (chain terminator) is a compound represented by a general formula (D) and/or (E) and/or (F);

[Chemical formula 18]

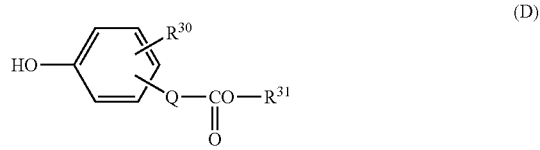

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 19]

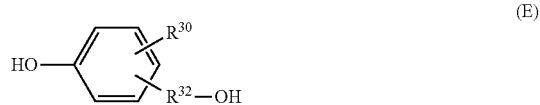

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20;

[Chemical formula 20]

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

17. The method for producing a contact lens material according to claim 14, wherein an amount of the highly polar molecular weight control modifier (chain terminator) to be added is 0.1-50 mole % relative to the total bisphenols.

18. The method for producing a contact lens material according to claim 14, wherein an amount of the highly polar molecular weight control modifier (chain terminator) to be added is 0.5-10 mole % relative to the total bisphenols.

19. The contact lens material according to claim 2, wherein the highly polar molecular weight control modifier (chain terminator) is a compound represented by a general formula (D) and/or (E) and/or (F);

[Chemical formula 7]

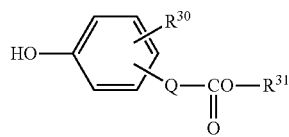

(D)

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 8]

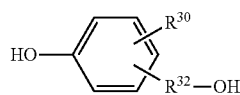

(E)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20;

[Chemical formula 9]

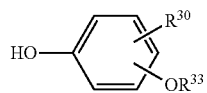

(F)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

20. The contact lens material according to claim 2, wherein the compound represented by the general formula (A) is at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane.

21. The contact lens material according to claim 2, wherein each of $R^{12}$ to $R^{16}$ in the general formula (B) is a methyl group, a phenyl group or a butyl group.

22. The contact lens material according to claim 2, wherein the compound represented by the general formula (B) is a compound represented by a general formula (B1) or a compound represented by a general formula (B2);

[Chemical formula 10]

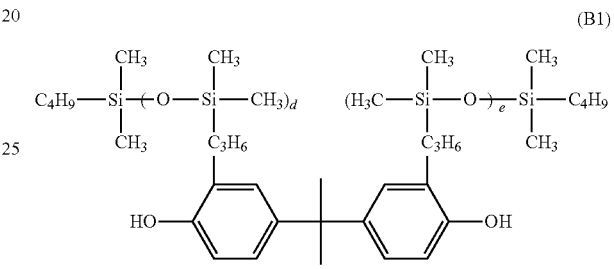

wherein each of d and e which denotes a repeat of silicone is an integer of 0 to 100;

[Chemical formula 11]

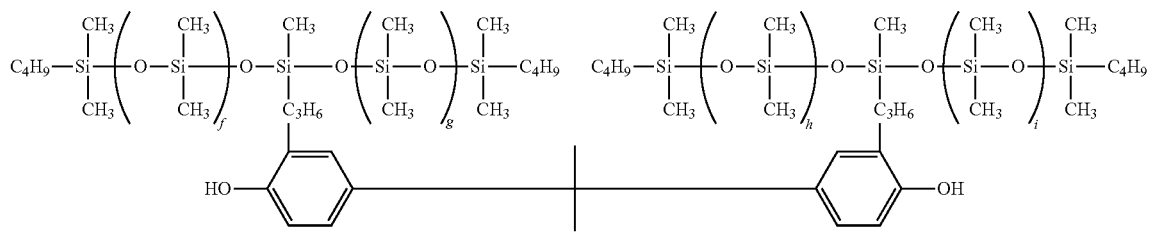

wherein each of f, g, h and i is an integer of 0 to 100.

23. The contact lens material according to claim 2, wherein a ratio of the compound represented by the general formula (A) to the compound represented by the general formula (B) is 25:75 to 75:25 by weight.

24. The contact lens material according to claim 2, wherein a ratio of the compound represented by the general formula (A) to the compounds represented by the general formulas (B) and (C) is (A):(B+C)=25:75 to 75:25 by weight.

25. The contact lens material according to claim 2, wherein an amount of the highly polar molecular weight control modifier (chain terminator) to be added is 0.1-50 mole % relative to the total bisphenols.

26. The contact lens material according to claim 2, wherein an amount of the highly polar molecular weight control modifier (chain terminator) to be added is 0.5-10 mole % relative to the total bisphenols.

27. The method for producing a contact lens material according to claim 15, wherein the highly polar molecular weight control modifier (chain terminator) is a compound represented by a general formula (D) and/or (E) and/or (F);

[Chemical formula 18]

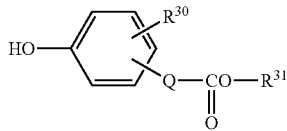

(D)

wherein Q is a direct bond or a hydrocarbon group of C1 to C6, $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{31}$ is a hydrogen atom or a hydrocarbon group of C1 to C20;

[Chemical formula 19]

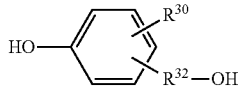

(E)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{32}$ is a hydrocarbon group of C1 to C20;

[Chemical formula 20]

(F)

wherein $R^{30}$ is a hydrogen atom or a group selected from the group consisting of an alkyl group of C1 to C10, an alkenyl group of C2 to C10, an alkoxy group of C1 to C10 and an aryl group of C6 to C12, $R^{33}$ is a hydrocarbon group of C1 to C20.

28. The method for producing a contact lens material according to claim 15, wherein an amount of the highly polar molecular weight control modifier (chain terminator) to be added is 0.1-50 mole % relative to the total bisphenols.

29. The method for producing contact lens material according to claim 15, wherein an amount of the highly polar molecular weight control modifier (chain terminator) to be added is 0:5-10 mole % relative to the total bisphenols.

* * * * *